(12) United States Patent
Hackworth

(10) Patent No.: US 7,739,614 B1
(45) Date of Patent: Jun. 15, 2010

(54) SYSTEM AND METHOD FOR CONSOLIDATED REPORTING OF CHARACTERISTICS FOR A GROUP OF DIRECTORIES

(75) Inventor: Brian M. Hackworth, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1014 days.

(21) Appl. No.: 10/234,621

(22) Filed: Sep. 4, 2002

Related U.S. Application Data

(63) Continuation-in-part of application No. 09/862,949, filed on May 22, 2001.

(51) Int. Cl.
G06F 3/048 (2006.01)

(52) U.S. Cl. .................. 715/771; 715/772; 715/773; 715/774; 715/777

(58) Field of Classification Search .......... 715/771–775, 715/777
See application file for complete search history.

(56) References Cited

U.S. PATENT DOCUMENTS

| | | | | |
|---|---|---|---|---|
| 5,644,736 | A | * | 7/1997 | Healy et al. .................. 715/784 |
| 5,678,042 | A | * | 10/1997 | Pisello et al. ................. 714/47 |
| 5,819,028 | A | * | 10/1998 | Manghirmalani et al. ..... 714/57 |
| 5,819,292 | A | | 10/1998 | Hitz et al. |
| 5,948,110 | A | | 9/1999 | Hitz et al. |
| 5,950,225 | A | | 9/1999 | Kleimann |
| 5,963,962 | A | | 10/1999 | Hitz et al. |
| 6,035,306 | A | * | 3/2000 | Lowenthal et al. .......... 707/200 |
| 6,038,570 | A | | 3/2000 | Hitz et al. |
| 6,049,775 | A | | 4/2000 | Gertner et al. |
| 6,119,244 | A | | 9/2000 | Schoenthal et al. |
| 6,138,126 | A | | 10/2000 | Hitz et al. |
| 6,230,204 | B1 | * | 5/2001 | Fleming, III ................. 709/229 |
| 6,233,600 | B1 | | 5/2001 | Salas et al. |
| 6,320,585 | B1 | | 11/2001 | Engel et al. |
| 6,346,954 | B1 | * | 2/2002 | Chu et al. ..................... 715/764 |
| 6,430,711 | B1 | | 8/2002 | Sekizawa |
| 6,434,621 | B1 | * | 8/2002 | Pezzillo et al. .............. 709/231 |
| 6,505,256 | B1 | * | 1/2003 | York ........................... 709/246 |
| 6,542,854 | B2 | * | 4/2003 | Yang et al. ................... 702/186 |
| 6,633,912 | B1 | * | 10/2003 | Welter et al. ................ 709/224 |

(Continued)

OTHER PUBLICATIONS

Veritas, Volumne Manger Storage ADministrator 3.1.1, Feb. 2001.*

(Continued)

*Primary Examiner*—Simon Ke
(74) *Attorney, Agent, or Firm*—Cesari and McKenna, LLP

(57) ABSTRACT

A system and method enables one or more directories or qtrees on one or more volumes associated with one or more storage appliances (filers) to be combined or consolidated into arbitrary groups so that statistical information related to performance, operational status and other usage-based parameters can be made available to interested parties associated with the group. The directories can draw from different volumes and grouped so as to allow administration and access by a common group of administrators or users. The statistical information can be compared to threshold values to generate events. The events can be e-mailed or otherwise transmitted to interested parties. The statistical information can also be organized and displayed in a variety of formats as a web page on a graphical user interface that resides on a management station and/or client display of an interested party.

60 Claims, 19 Drawing Sheets

U.S. PATENT DOCUMENTS

| | | | |
|---|---|---|---|
| 7,107,534 B1 * | 9/2006 | de Jong et al. | 715/734 |
| 2002/0054169 A1 * | 5/2002 | Richardson | 345/854 |

OTHER PUBLICATIONS

U.S. Appl. No. 09/862,949, Brian M. Hackworth.
U.S. Appl. No. 10/100,879, Manley et al.
David Hitz et al. TR3002 File System Design for a NFS File Server Appliance published by Network Appliance, Inc.
Common Internet File System (CIFS) Version: CIFS-Spec 0.9, Storage Networking Industry Associations (SNIA), Draft SNIA CIFS Documentation Work Group Work-in-Progress, Revision Date: Mar. 26, 2001.
Fielding et al. (1999) Request for Comments (RFC) 2616, HTTP/1.1.
Stallings, William, "SNMP, SNMPv2 and RMON", Addison-Wesley Publishing Company, Copyright 1996, 250 pages.

* cited by examiner

SYSTEM AND METHOD FOR CONSOLIDATED REPORTING OF CHARACTERISTICS FOR A GROUP OF DIRECTORIES

CROSS-REFERENCE TO RELATED APPLICATIONS

The present application is a continuation-in-part of commonly assigned copending U.S. patent application Ser. No. 09/862,949, which was filed on May 22, 2001, by Brian M. Hackwoth for a SYSTEM AND METHOD FOR CONSOLIDATED REPORTING OF CHARACTERISTICS FOR A GROUP OF FILE SYSTEMS and is hereby incorporated by reference.

FIELD OF THE INVENTION

The present invention relates to networked storage systems and more particularly to systems for reporting status and other information with respect to a group of directories within a networked storage system environment.

BACKGROUND OF THE INVENTION

A network storage appliance is a special-purpose computer that provides file service relating to the organization of information on storage devices, such as disks. The network storage appliance or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially formatted file in which information about other files and directories are stored. An example of a file system that is configured to operate on a filer is the Write Anywhere File Layout (WAFL™) file system available from Network Appliance, Inc., Santa Clara, Calif.

A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link or a shared local area network (LAN) wide area network (WAN) or a virtual private network (CVPN). Each client may request the services of the filer by issuing file system protocol messages (in the form of packets) to the filer over the network.

A filer is organized so that it includes one or more of storage "volumes" that comprise a cluster of physical storage disks, defining an overall logical arrangement of storage space. Currently available filer implementations can serve a large number of discrete volumes (in one illustrative example 150, although this number is subject to increase). Each volume is generally associated with its own file system (WAFL for example). The disks within a volume/file system are typically organized as one or more is groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group.

A complex distributed storage arrangement typically requires monitoring and administration of various devices (e.g. disks, filers, etc.) by a competent network administrator at regular intervals. Expected maintenance items and unexpected alert conditions may arise, requiring intervention by the administrator. For example, physical disks may run low on storage or even occasionally malfunction, or other significant events may impair function of a particular volume or of the entire network. In such cases, the administrator should be alerted so that he or she may take appropriate action Currently available network administration tools enable an operator to retrieve various status and performance information/reports from individual volumes, or from the entire array of network devices. While such reporting is valuable, it is often limited in usefulness, particularly where a large network of disparate users is present. For example, a large organization such as a bank may have a variety of separate departments, each having its own requirements and characteristics of network use. In order to effectively monitor and administer the various departments it is desirable to divide volumes into separate reporting groups. In addition, it may be desirable to selectively group certain volumes into more than one group where a given volume may cross certain departmental lines. For example upper management may wish to view data from a variety of departments, that are otherwise restricted to individuals in the particular departments. Similarly, certain departments may be subject to system alerts that are particularly critical. For example, the bank's credit card department may be more concerned about low storage than the safe deposit box department due to the relatively greater rate at which credit card transactions are accumulated. Having a low-storage alert tailored to this critical group can expedite action by the administrator.

Accordingly, it is an object of the present invention to provide a system and method for selectively grouping discrete directories of a network storage arrangement into separate groups that may be a subset of the overall network architecture. This system and method should provide customization and versatility with respect to the type of information that are reported for the various groups and should allow alert information to be tailored to the particular group.

SUMMARY OF THE INVENTION

This invention overcomes the disadvantages of the prior art by providing a system and method for enabling one or more directories (such as a qtree) on one or more storage devices, for example, file servers or (filers) to be combined or consolidated into arbitrary groups so that statistical information related to performance, operational status and other usage-based parameters can be provide to interested parties associate with the group. The directories can be drawn from different storage devices, and their statistical information can be grouped/consolidated so as to allow administration and access by a common group of administrators or users.

According to a preferred embodiment, the grouping of directories is controlled via a management station that is attached to the network containing the volumes. The management station includes a graphical user interface that allows the groups to be organized and displayed. A monitor process polls the directories for statistical information and returns it to the management station. There is a database that stores information about users in the group and various threshold values that are associated with the statistical information. The monitor process compares the thresholds to the monitored statistical information and determines whether an event has occurred. If an event has occurred, then the monitor process notifies an event process that determines whether there are listed any interested parties in the event, and, if so, how to notify the parties. In a typical form of notification, the event process can e-mail at least some of the interested parties in the group (e.g. users, administrators and managers) if an event has occurred. Similarly, the notification can take the form of an alarm, alert, telephone call or page to an interested party that is implemented through appropriate automated systems. There is also a command is process that generates displays on the statistical information using, preferably a webbased format that is accessed by a browser on the management station's graphical user interface or on an interested party's client display.

According to an illustrative embodiment, the graphical user interface can display statistical information in connection with the group in a variety of formats that can be organized based upon the group's directories volumes associated with the various directories, the devices within volumes (e.g. disks), the storage devices implicated by the group, or with respect to selected events or alerts. The information can include color-coded alert information or status displays that show the relative severity of the problem associated with the event/alert (e.g. low storage, disk failure and the like).

According to another aspect of the invention statistical information stored on the database resulting from the polling of the monitor process can be bundled in various time periods (e.g. days, weeks, quarters) that each have roughly the same number of intervals, each bundle having a different relative time span between respective intervals. In this manner samples for more recent time periods are maintained in smaller intervals, while samples for older time periods are maintained at successively longer sample intervals. This reduces the concomitant burden on the database.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

A. Network Environment

Figure 1:
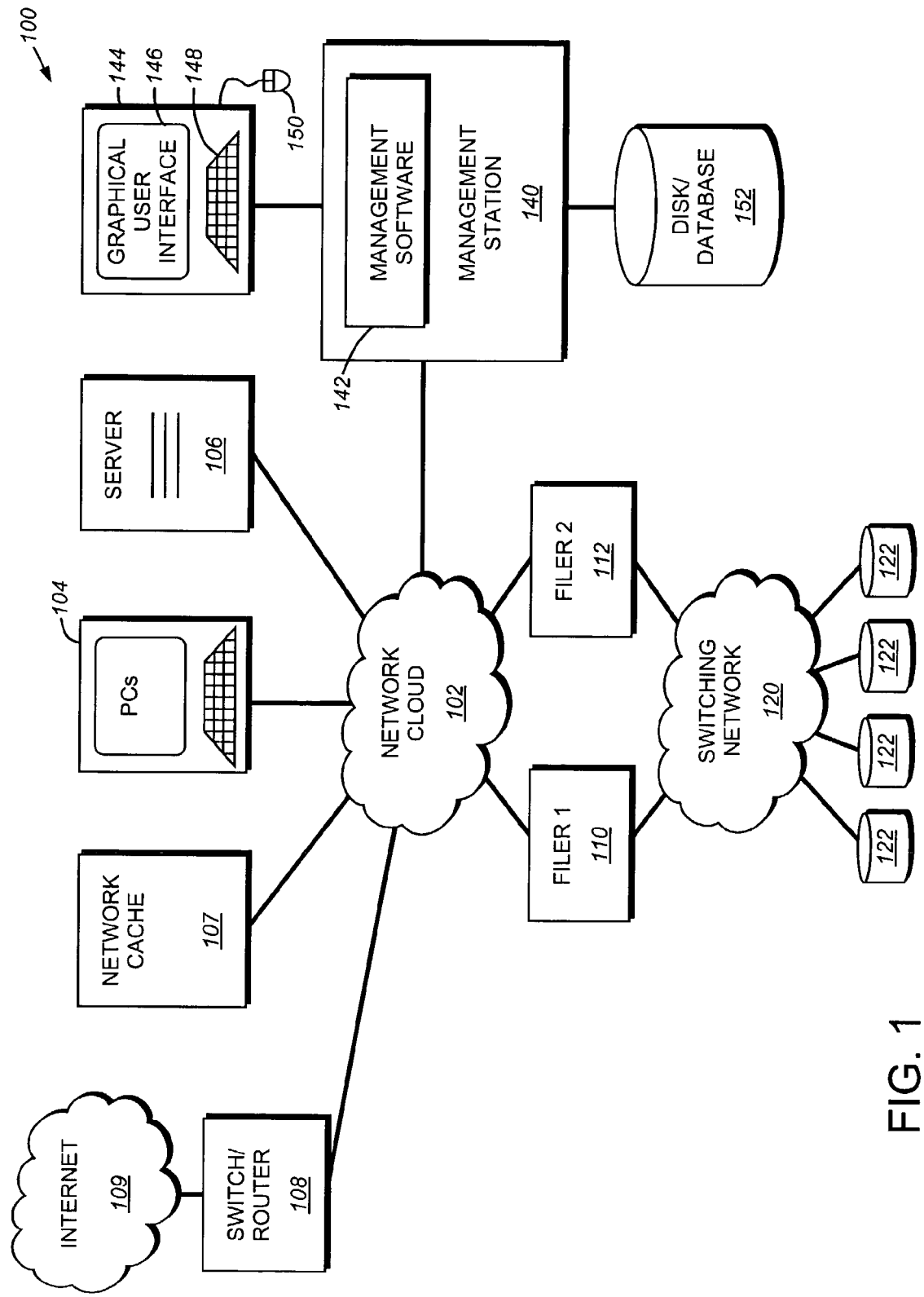
FIG. 1 is a schematic block diagram of a network environment including various networked devices including exemplary network storage appliances having filers and associated volumes, and a management station according to an embodiment of this invention.

FIG. 1 is a schematic block diagram of an exemplary network environment 100 in which the principles of the present invention are implemented. The network 100 is based around a network cloud 102. The network cloud can be a local area network (LAN) wide area network (WAN), virtual private network (VPN) implementation (utilizing communication links over the Internet, for example), or a combination of LAN, WAN and VPN implementations. For the purposes of this description, the term "LAN" should be taken broadly to include any acceptable networking architecture. The network cloud 102 inter-connects various clients based upon personal computers (PCs) 104, servers 106 and a network cache 107. Also interconnected to the LAN may be a switch/router 108 that provides a gateway to the well-known Internet 109, thereby enabling various networked devices to transmit and receive internet based information, including e-mail, web content, and the like.

In addition exemplary filers 110 and 112 (Filer1 and Filer2, respectively) are connected to the LAN. These filers, (described further below) are network storage appliances configured to control storage of, and access to, data in a set of interconnected storage volumes. As described further below, each volume is typically organized to include one or more RAID groups of physical storage disks for increased data storage integrity and reliability. Additionally, each filer is connected to a switching network 120, which, in turn, is connected to a plurality of disks 122. The switching network can be any acceptable networking architecture including, for example, a fibre channel fabric.

Each of the devices attached to the network cloud include an appropriate, conventional network interface arrangement (not shown) for communicating over the LAN using desired communication protocols, such as the well-known Transport Control Protocol/Internet Protocol (TCP/IP), User Datagram Protocol (UDP), Hypertext Transfer Protocol (HTTP) or Simple Network Management Protocol (SNMP).

Also connected to the network cloud 102 is a management station 140 according to the illustrative embodiment of this invention. The management station 140 can include a server or PC-based computer with a network interface for communicating over the network cloud. Within the management station 140 resides the management software 142, the function of which is described further below. In general, the software 142 enables an administrator or other operator to access usage and performance information with regard to various LAN-connected devices, including the filers 110 and 112 and associated volumes. The management station, in the illustrative embodiment, utilizes an SNMP communication process to obtain and manipulate this information. This protocol is designed to enable networks to be remotely managed from a centralized management station. In particular it comprises a packet-based protocol using messaging to communicate with networked devices and clients. The messages are provided as management information blocks (MIBs). The MIBs and SNMP protocol, and their use in providing network management information between SNMP management stations and agents are well-known and described in SNMP, SNMPv2 and RMON by William Stallings, printed by Addison Wesley Publishing Company, 1996. The information is displayed and manipulated using a graphical user interface (GUI) 144 that can include a display 146, keyboard 148 and mouse 150 (or other GUI-compatible device, such as a touch-screen). In addition a storage disk 152 or other memory device is interconnected with the management station computer 140. This storage disk 152 stores database information on various devices and their associated statistics as well as other data related to management station operations to and functions. The configuration of the storage can be based upon RAID or another architecture.

B. File Server Architecture

Figure 2:
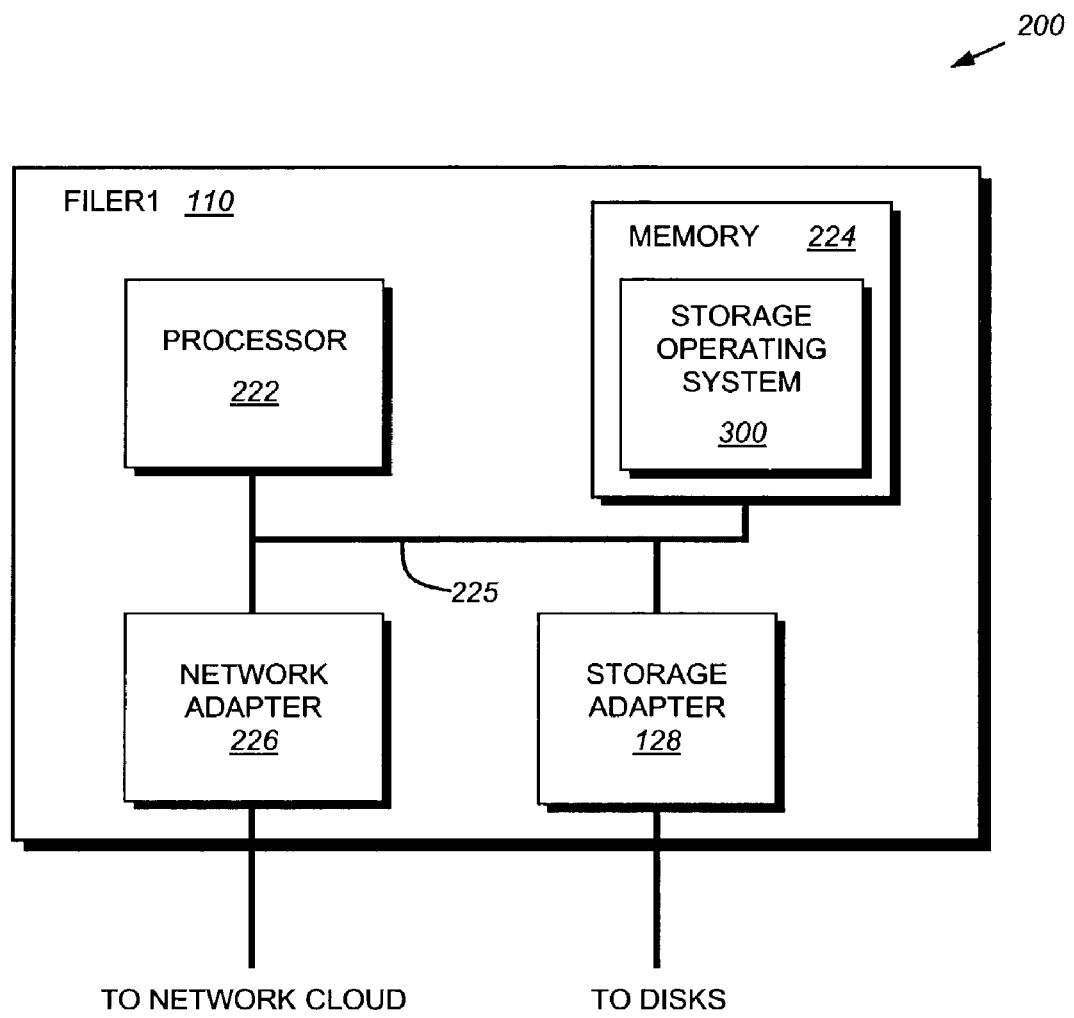
FIG. 2 is a more-detailed schematic block diagram of an exemplary network storage appliance in accordance with FIG. 1.

FIG. 2 is a more-detailed schematic block diagram of an exemplary network stores age appliance 110 (Filer 1) that is advantageously used with the present invention. Other filers can have similar construction (including exemplary Filer2 (112). By way of background, a network storage appliance or filer is a special-purpose computer that provides file service relating to the organization of information on storage devices, such as disks. However, it will be understood to those skilled in the art that the inventive concepts described herein may apply to any type of special-purpose (e.g., server) or general-purpose computer, including, for example, a standalone computer. The exemplary filer 110 comprises a processor 222, a memory 224, a network adapter 226 and a storage adapter 228 interconnected by a system bus 225. The memory 224 includes, in the illustrative embodiment, a storage operating system 300 that implements a file system to logically organize the information as a hierarchical structure of directories and files on the disks.

In the illustrative embodiment, the memory 224 may have storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the filer 110 by, inter alfa, invoking storage operations in support of a file service implemented by the filer. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the filer 110 to a client 104 (including management station 140) (see FIG. 1) over the network 102, which, as described generally above, can comprise a to point-to-point connection or a shared medium, such as a local area network. A client (104, 140) can be a general-purpose computer configured to execute applications including file system protocols, such as the Common Internet File System (CIFS) protocol. Moreover, the client can interact with the filer 110 in accordance with a client/server model of information delivery. That is, the client may request the services of the filer, and the filer may return the results of the services requested by the client, by exchanging packets that encapsulate, e.g., the CIFS protocol format over the network 102. The format of the CIFS protocol packet exchanged over the network is well-known and described in Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

The storage adapter 228 cooperates with the storage operating system 300 executing on the filer to access information requested by the client, which information may be stored on a number of storage volumes 124 each constructed from an array of physical disks that are organized as RAID groups. The RAID groups include independent physical disks including those storing striped data and those storing separate parity for the data, in accordance with a preferred RAID 4 configuration. However, other configurations (e.g. RAID 5) are also contemplated.

The storage adapter 228 includes input/output (I/O) interface circuitry that couples to the disks over an I/O interconnect arrangement, such as a conventional high-performance, Fibre Channel serial link topology. The information is retrieved by the storage adapter 228 and, if necessary, processed by the processor 222 (or the adapter 228 itself) prior to being forwarded over the system bus 225 to the network adapter 226, where the information is formatted into a packet and returned to the client 110.

To facilitate access to the disks 122, the storage operating system 300 implements a file system that logically organizes the information as a hierarchical structure of directories and files on the disks. Each "on-disk" file may be implemented as set of disk blocks configured to store information, such as text, whereas the directory may be implemented as a specially formatted file in which other files and directories are stored. In to the illustrative embodiment described herein, the storage operating system 360 associated with each volume may be the NetApp® Data ONTAP™ operating system available from Network Appliance, Inc. of Sunnyvale, Calif. that implements a Write Anywhere File Layout (WAFL) file system. The illustrative storage operating system for the exemplary filer is now described briefly. However, it is expressly contemplated that the principles of this invention can be implemented using a variety of alternate storage operating system architectures.

C. Storage Operating System

Figure 3:
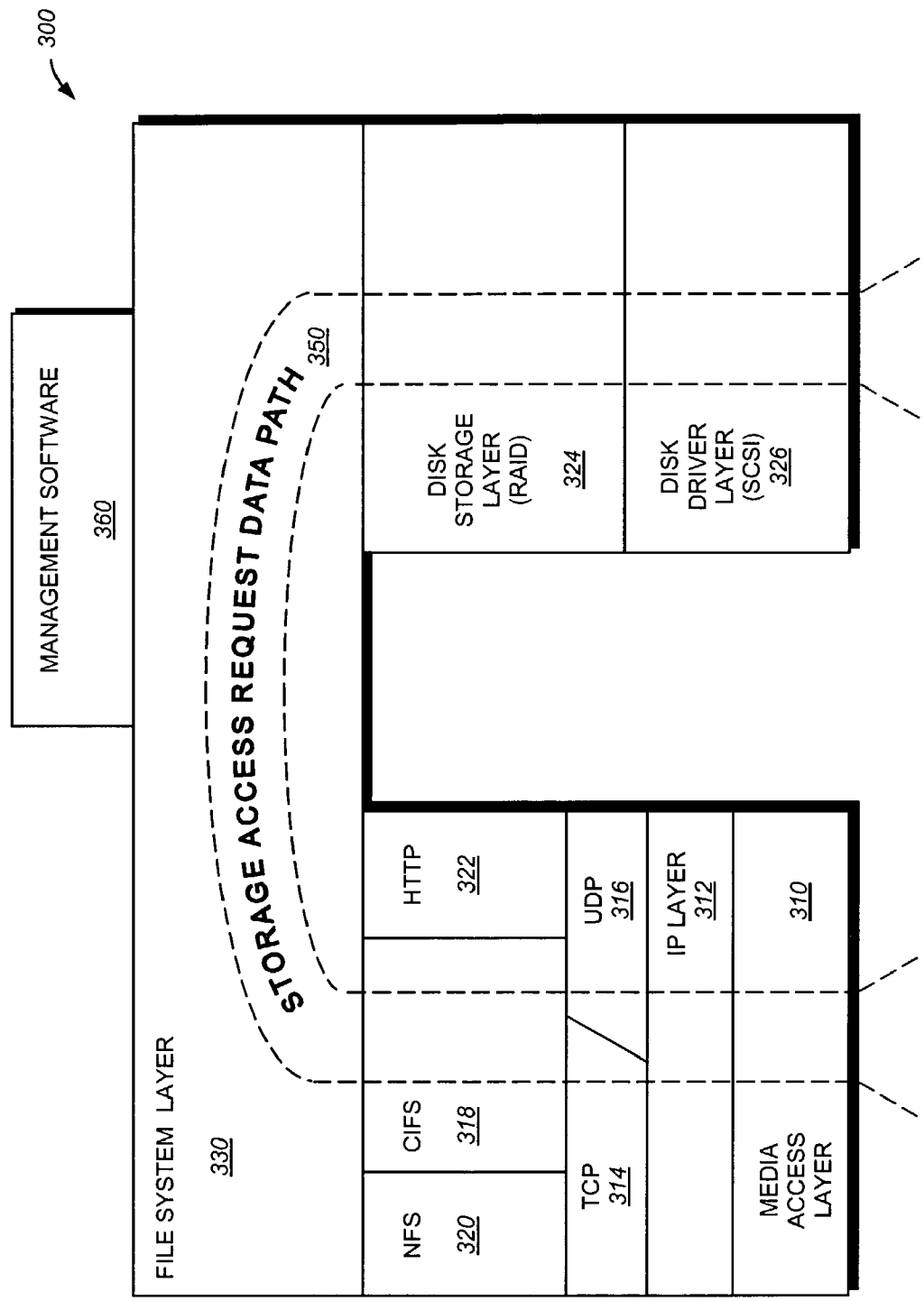
FIG. 3 is a schematic block diagram of an operating system for use with the exemplary network storage appliance of FIG. 2 according to an embodiment of this invention.

As shown in FIG. 3, the exemplary storage operating system 300 comprises a series of software layers, including a media access layer 310 of network drivers (e.g., an Ethernet driver). The storage operating system 300 further includes network protocol layers, such as the Internet Protocol (IP) layer 312 and its Transport Control Protocol (TCP) layer 314, and Universal Data Protocol (UDP) layer 316. A file system protocol layer provides multi-protocol data access and, to that end, includes support for the Common Internet File System (CIFS) protocol 318, the Network File System (NFS) protocol 320 and the Hyper Text Transfer Protocol (HTTP) protocol 322. In addition, the operating system 230 includes a disk storage layer 324 that implements a disk storage protocol, such as the RAID protocol, and a disk driver layer 326 that implements a disk access protocol such as, e.g., a Small Computer Systems Interface (SCSI) protocol. Bridging the disk software layers with the network and file system protocol layers is a file system layer 330 of the operating system. Generally, the file system layer, in the illustrated embodiment, implements a file system having an on-disk format representation that is block-based using, e.g., 4-kilobyte (KB) data blocks and using modes to describe the files. The file system generates operations to load (retrieve) the requested data from volumes if it is not resident "in-core", i.e., in the filer's memory 224. If the information is not in memory, the file system layer 330 indexes into the Mode file using the Mode number to access an appropriate entry and retrieve a logical volume block number. The file system layer then passes the logical volume block number to the disk storage (RAID) layer 324, which maps that logical number to a disk block number and sends the latter to an appropriate driver (e.g., SCSI) of the disk driver layer 326. The disk driver accesses the disk block number from volumes and loads the requested data in memory 224 for processing by the filer. Upon completion of the request, the filer (and operating system) returns a reply, e.g., a conventional acknowledgement packet defined by the CIFS specification, to the client 104, over the network 102. It should be noted that the software "path" 350 through the operating system layers described above needed to perform data storage access for the client request received at the filer may alternatively be implemented in hardware.

Additionally, a set of management software 360 operating on the filer in conjunction with the storage operating system provides management capabilities and reporting structures that can be utilized with management software 142 (see FIG. 1).

D. Grouping of Directories

According to one aspect of the invention, separate directories or qtrees located on disparate volumes can be grouped according to predetermined criteria to create reporting groups that are used advantageously. A qtree (or quota tree) is a logical subunit of a volume that contains many properties of the volume. A given volume can contain many qtrees, but a qtree can have neither a volume nor another qtree under it. In known file system implementations, high-level directories are often qtrees. This enables a system administrator to assign various properties on a qtree-by-qtree level. Thus, for example, an engineering volume may have several high-level directories, one for each of several projects that are ongoing. If each of these high-level directories is also a qtree, then various permissions and other properties can be set for each.

Qtrees are further described in U.S. patent application Ser. No. 10/100,879, FORMAT FOR TRANSMISSION OF FILE SYSTEM INFORMATION BETWEEN A SOURCE AND A DESTINATION, by Stephen L. Manley, et al., entitled the contents of which are incorporated herein by reference. As used herein, the terms "directory" and "qtree" will be used interchangeably to mean a directory, or other sub-volume unit qtree that is capable of being monitored and managed in accordance with the present invention.

Figure 4:
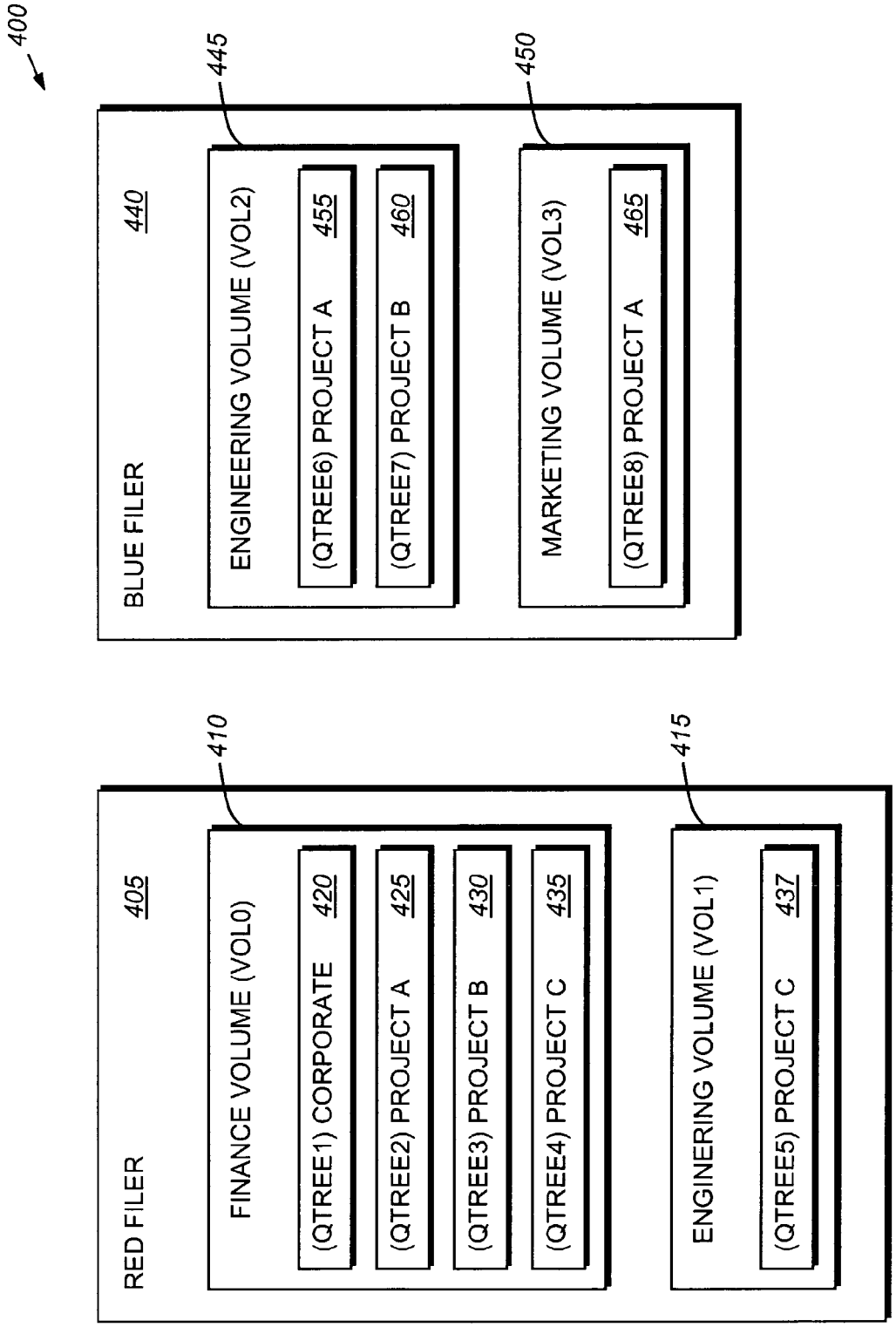
FIG. 4 is an illustrative graphical representation of a group of qtrees and volumes in accordance with an embodiment of the invention.

FIG. 4 shows an exemplary graphical representation of a Red Filer 405 and Blue Filer 440 and various volumes and qtrees managed by each. In the exemplary environment, the Red Filer 405 includes a Finance Volume (vol 0) 410 and an Engineering Volume (vol 1) 415. Contained within the Finance Volume are four qtrees 420, 425, 430 and 435. The Engineering Volume 415 also includes a qtree 437. Similarly, the Blue Filer 440 includes an Engineering Volume (vol 2) 445 and a Marketing Volume (vol 3) 450. The Engineering Volume of the Blue Filer includes two qtrees 455 and 460, while the Marketing Volume 450 includes a qtree 465. As can be seen from the exemplary graphical representation, Project A includes qtree2 (425) in the Finance Volume 410, qtree6 (455) in the Engineering Volume 445 and qtree8 (465) in the Marketing Volume 450. A user or administrator responsible for interest in tracking information related to Project A would be interested in tracking all of the information related to these various qtrees. By utilizing the teachings of the present invention, the user or administrator could create a "Project A" group containing qtrees 425, 455 and 465. Using the present invention, the user or administrator would be able to effectively manage the Project A group.

Figure 5:
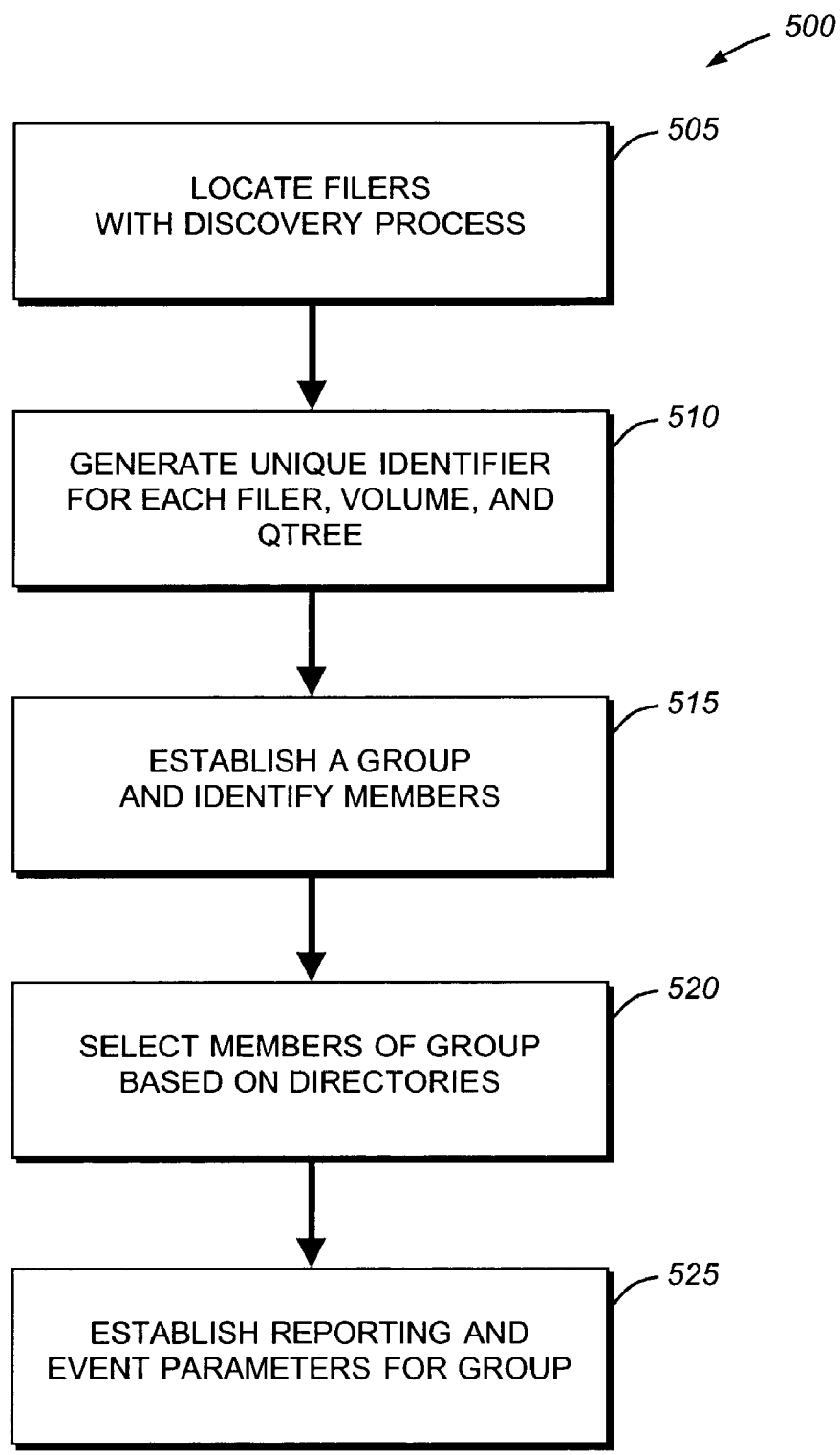
FIG. 5 is a flow chart of the steps of a procedure for grouping directories in accordance with an embodiment of the invention.
Figure 6:
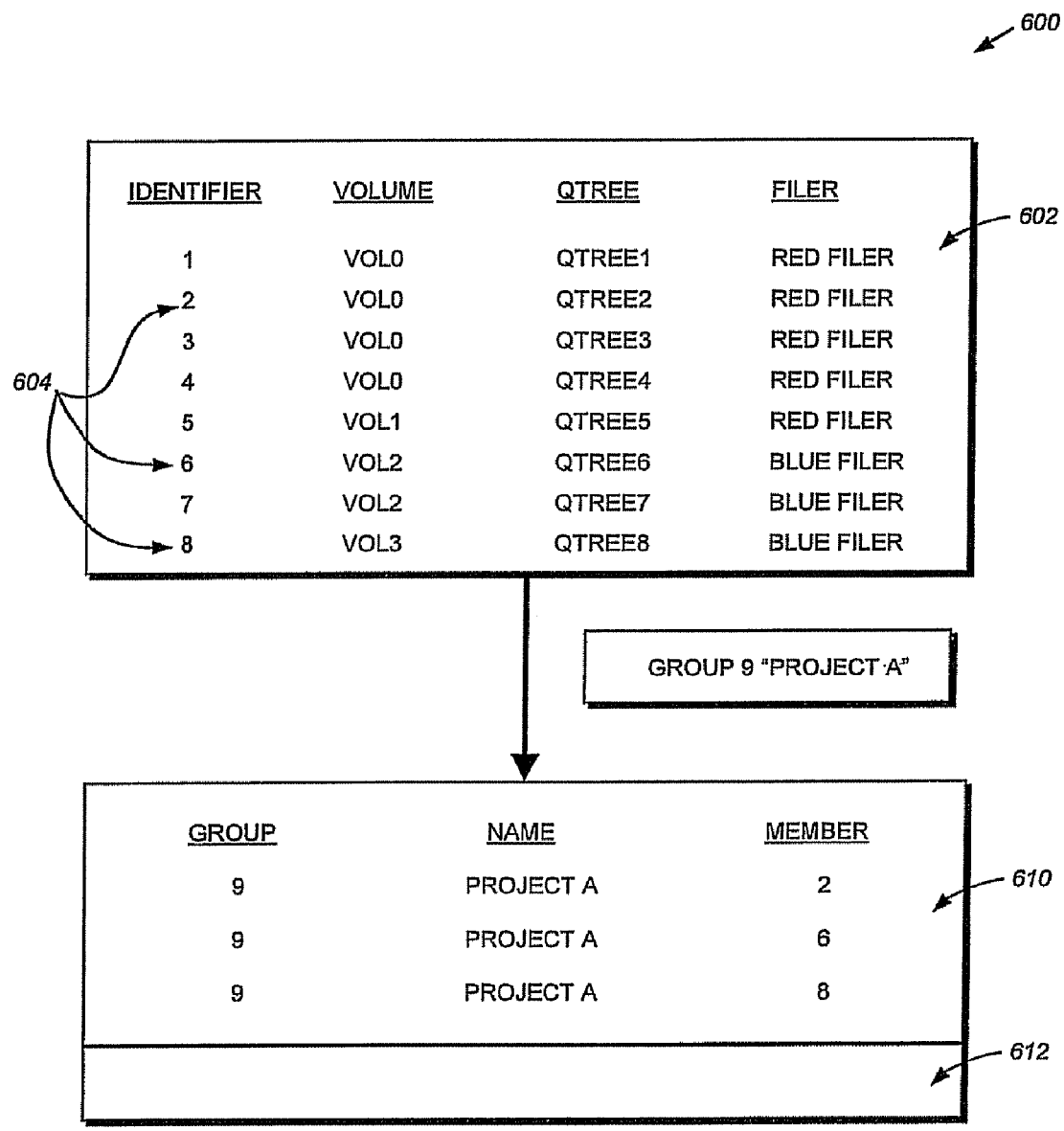
FIG. 6 is an illustrative graphical representation of a grouping in accordance with the procedure of FIG. 5 in accordance with an embodiment of the present invention.

Reference is made to FIG. 5, which shows a procedure 500 for grouping directories and to FIG. 6, which shows an illustrative graphical representation 600 of such a grouping. The procedure can be implemented by an administrator using the management station 140 and the graphical representation may be generally symbolic of the information appearing of the station's graphical user interface 144.

The procedure begins with the location of filers resident on the network and associated directories within the filers as detailed in step 505. In this example Filer1 and Filer2 are located and displayed in association with all respective qtrees or directories for example, Q1, Q2, Q3, etc. as denoted by the display window 602. Directories can be located manually by specifying the appropriate address (if such address is known), or the directories can be located automatically by the management software using a discovery process having appropriate polling capabilities. This discovery process is part of an overall monitor process within the management station that is described further below. In an illustrative embodiment, the discovery process uses Simple Network Management Protocol (SNMP) to communicate with the filers to extract the desired directory information.

In accordance with step 510, the management software then generates a unique identifier for each filer, volume and qtree. The identifiers are shown as discrete numbers 1-8. For example, Qtree1 is assigned identifier (ID) 1; QTree2 is assigned identifier 2, and so forth.

In accordance with step 515, the administrator can establish a group, which in this example, is identified as "PROJECT A" (Group 9). This group can be one of a large number of groups. Each group can be defined by a set of like users/members (e.g. a department) or by certain administrative criteria (those users having high-volume storage usage or users served by a particular administrator). In general, the creation of groups and other user-directed functions implicates a command process that interacts with the management software and stores input commands and data on a database, both of which are described further below.

In accordance with step 520, one or more directories related to the group (i.e. those containing data related to the group) are then selected for inclusion in the group. In the example of FIG. 6, the directories identified by numbers 2, 6, and 8 are selected by flagging the selected group members using the GUI as denoted by cursor marks 604. The resulting selection is depicted in the graphical window 610. Each of the members 2, 6, and 8 are associated with Group 9 "PROJECT A."

Finally, in accordance with step 525, any group-related reporting parameters and event parameters are assigned to the group using the GUI (window 612). In other words, various threshold values for reporting "events" or "alerts" in connection with one of the group directories or underlying devices (disks) are associated with the group. Such event parameters (described further below) can include, but are not limited to, exceeded thresholds for device or filer central processing unit (CPU) utilization, device environmental conditions (temperature, etc.), directory free space, disk free space NFS operations per second and whether the directory is growing too fast. As described below, these parameters are generally monitored by the management software's monitor process based upon SNMP polls passed over the network cloud. The reporting/polling period for various event parameters may vary based upon criticality of the parameters to normal operation and other criteria. In general, statistical information on devices within desired thresholds is also maintained for each group, and is accessed via the GUI by the operator/administrator of the management station 140, or like user interface.

In addition, the operator/administrator, in step 525, can establish the interested parties (e.g. user/clients other than the management station operator/administrator itself) to which selected information is to be reported (e.g. reporting parameters). This reporting takes the form of electronic mail (e-mail) delivered to e-mail in-boxes of the interested parties alerts using Simple Mail Transfer Protocol (SMTP) (see window 612). These interested parties can include local group administrators and particular users (for example, is an identified, specific user in a group who is exceeding allotted storage maximums). The reporting process is described further below.

Figure 7:
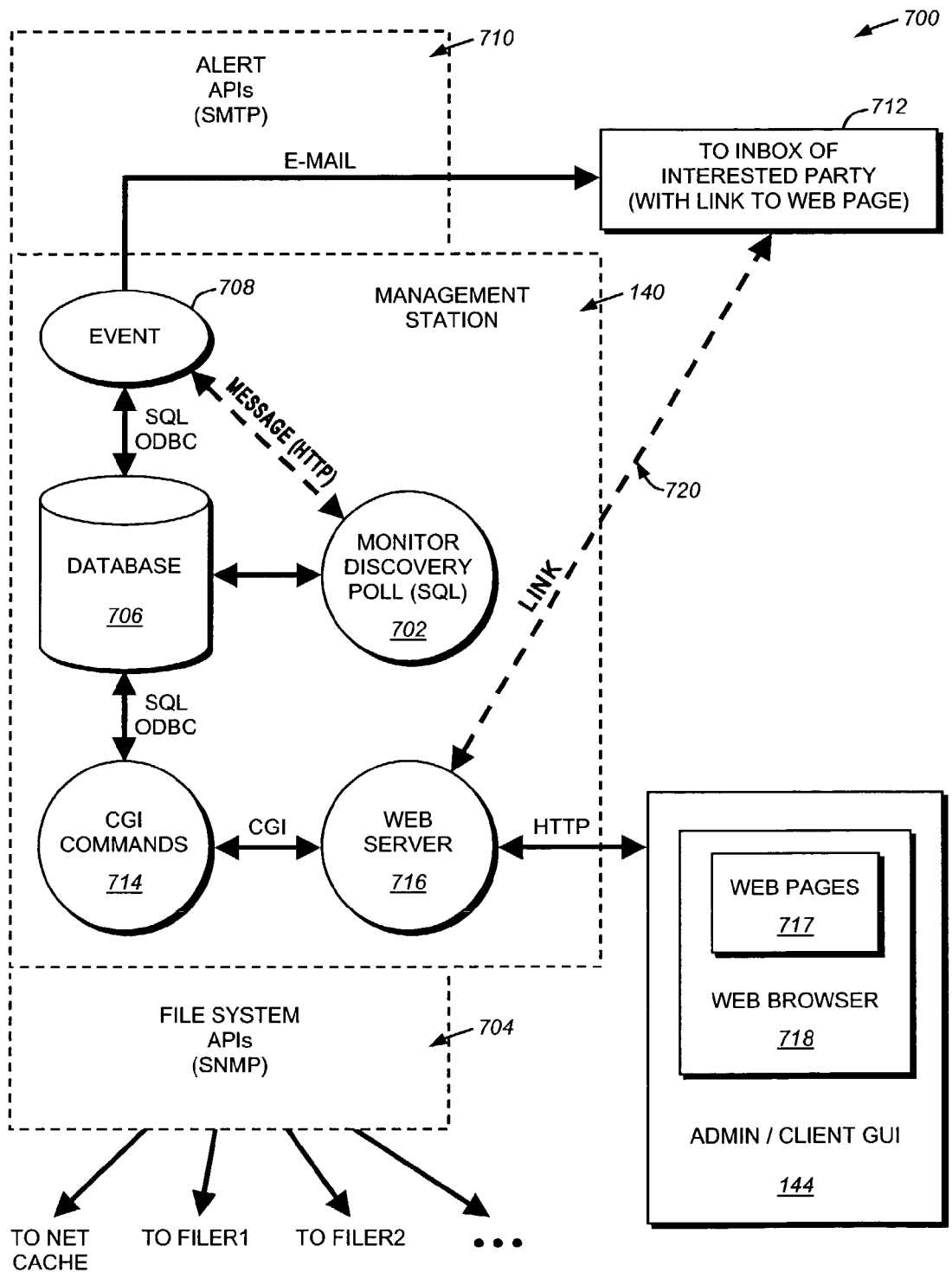
FIG. 7 is a functional block diagram of an exemplary management station in accordance with an embodiment of the invention.
Figure 8:
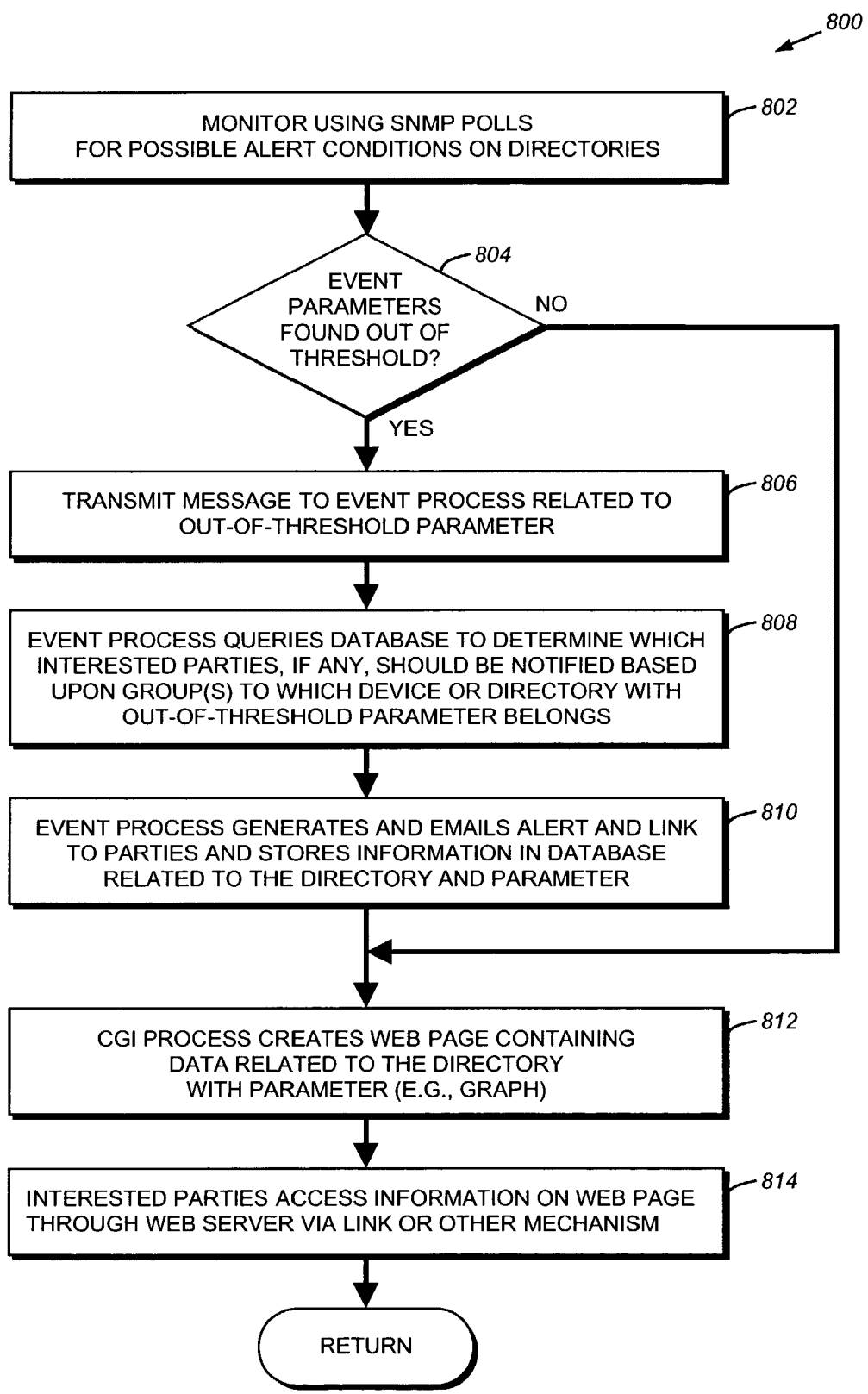
FIG. 8 is a flow chart detailing the steps of a procedure for reporting specified events to interested parties in a group according to an embodiment of the invention.

FIG. 7 shows the functional layout 700 of the management station 140 and interconnected clients/filers in further detail. Likewise, FIG. 8 shows a procedure 800 for reporting specified events to interested parties in a group according to an embodiment of this invention. In accordance with the procedure 800, the monitor process 702 executes continuously, polling for event data and statistical information in connection with each directory or other polled device. The SNMP protocol in the illustrative embodiment is used to transfer this data over the network cloud to each of the filers, network cache, etc. An appropriate file system application programming interface (API) 704 is used to support the use of SNMP in conjunction with the management station.

In accordance with decision step 804, the monitor process 702 determines whether an event has been detected that requires a report to occur. The monitor can be supplied with the appropriate threshold values, either stored by the administrator or preset in the database 152. The monitor performs a comparison of received statistical information to threshold information contained in the database. According to one embodiment, the database 152 is a relational-type database, such as one commercially available from Sybase Corporation of Emeryville, Calif. However, any acceptable data-storage arrangement can be employed. In this embodiment, the database 706 can be organized and accessed using the Structured Query Language (SQL) and the Open DataBase Connectivity (ODBC) standard. If an event occurs, such as an out-of-threshold parameter, the decision step branches to step 806 in which the monitor process transmits the details of the event to the event process 708 using an appropriate messaging protocol, such as HTTP.

The event process 708 then queries the database 152, in accordance with step 808 to determine if any interested parties/group members are implicated by the event with respect to the particular volume or device. Note that a given directory may implicate multiple groups. If the database 706 contains entries relating to the directory, this data is returned to the event process 708. These entries can include web links for related information (described below) and e-mail addresses for the interested parties.

In accordance with step 810, the event process 708 uses appropriate APIs 710 to generate e-mail messages to each interested party retrieved from the database with respect to the implicated group or groups. The e-mails can be transmitted using the SMTP protocol, and show up as e-mailed alerts on the events in the interested parties' inboxes 712. In this manner, specific administrators and others are immediately informed of any critical information involving volumes directed related to their group or themselves. The management station can include an appropriate e-mail server application, interacting with the event process, to facilitate the e-mail function. Alternatively, the notification of an event can take the form of an alarm, alert, telephone call, page or other messaging mechanism to an interested party that is implemented through appropriate automated systems.

In accordance with step 812, the database 706 is also queried by a command process 714. This process uses a common gateway interface (CGI) to generate web-based reports on particular volumes. The CGI is used as an interface between the command process 714 and its associated command tools and a web server 716. The directory information is accessed via the web server 716, which provides web content (including web pages 717) through a web browser application 718 resident on the computer console of the administrator (via GUI 144), and/or on the client displays of other interested parties. The content can be displayed in any acceptable and useful form including graphs as described further below. Note that the decision step, in absence of a particular event or alert, branches to step 812, in which updated statistics on volumes can be obtained at any time by group members and the administrator via web pages.

It is contemplated that various access control limitations may be placed on members of a group when appropriate. The administrator can set certain access control limitations through the database or web server. A governing access control list (ACL) can reside on the database 152 (or elsewhere) for this purpose. Permitted individuals can access the information, including specific event information in accordance with step 814.

As part of the event notification/reporting process, e-mails to interested parties can include conventional web links 720 to the web pages on volume statistics or to outside web-links accessed via, for example, the Internet. These links can be routed through the web server 716 and/or through another network switching appliance connected to the is network (e.g. router 108). By accessing the links, interested parties can bring up the relevant statistical data on the affected volume or another utility, such as an application (e.g. a repair program) that is designed to diagnose or address the problem that triggered the alert/event.

E. Consolidated Reporting of Groups of Directories

A typical format of a graphical user interface (GUI) displayed to the administrator and interested parties is shown in further detail in FIGS. 9-19. It is expressly contemplated that a variety of formats and organizational schemes for displaying and manipulating data can be employed. The version described herein is only one possible arrangement. In one embodiment this graphical user interface can be based upon a web-enabled browser such as Internet Explore™ available from Microsoft Corporation of Redmond, Wash., or another appropriate graphical user interface software platform.

Examples of displays of the graphical user interface window when the "appliance" tab 920 (FIG. 9) is selected are further described in U.S. application Ser. No. 09/862,949 entitled SYSTEM AND METHOD FOR CONSOLIDATED REPORTING OF CHARACTERISTICS FOR A GROUP OF FILE SYSTEMS, by Brian M. Hackworth, which is hereby incorporated by reference.

Figure 9:
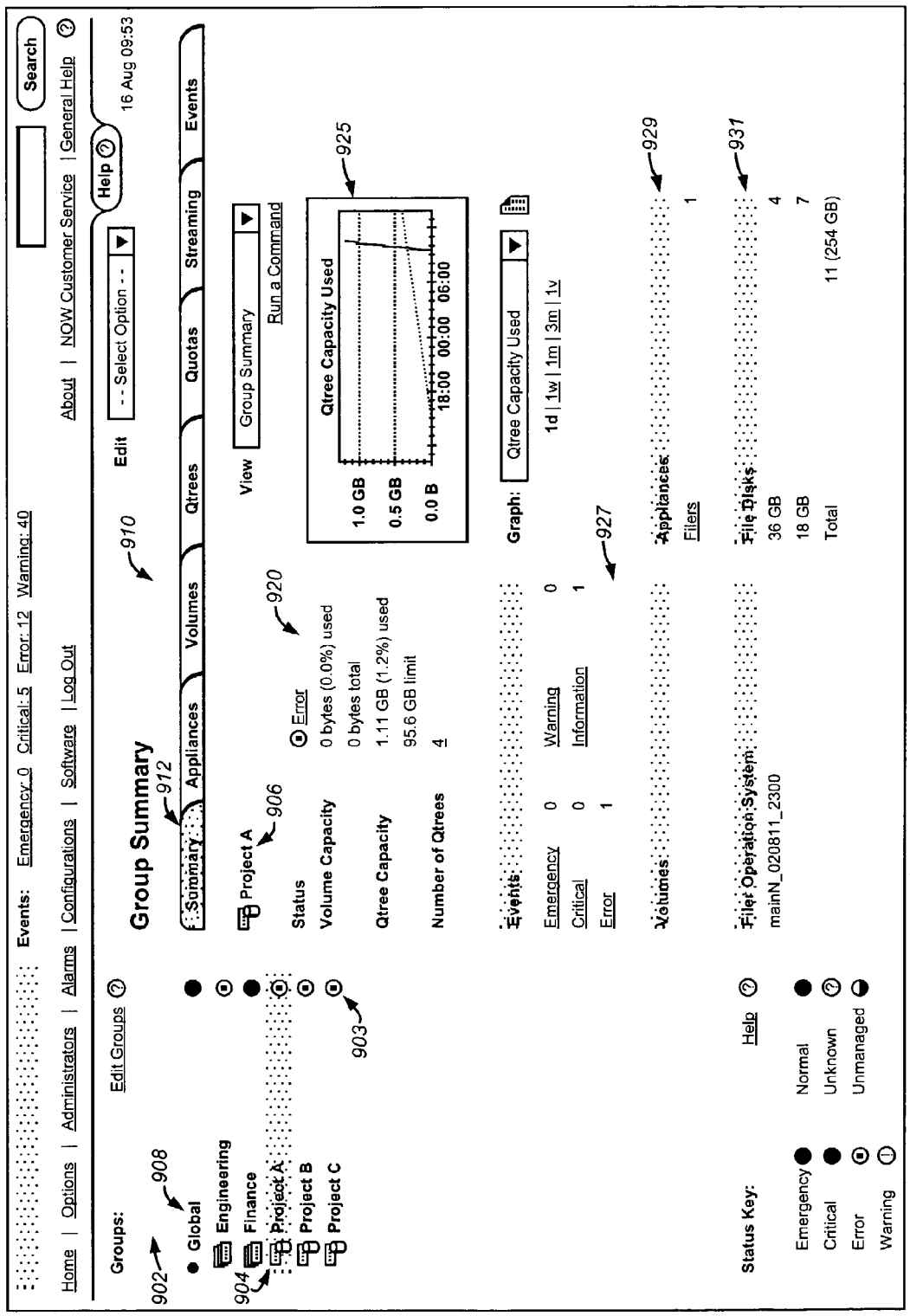
FIG. 9 shows a graphical user interface window that displays basic summary information for a particular group in accordance with an embodiment of the invention.

FIG. 9 shows a GUI window 900 that displays the basic summary information for a particular predefined group. Established groups are displayed in the section or box 902. The entries can be color coded to identify the status of a given group. In the illustrated embodiment, a color coded icon 903 is utilized to display the status of a given volume. For example, a green icon may represent normal operation, while yellow represents an error and red an emergency status level. In this example "Project A" 904 has been selected by cursor. The selected group title is shown in the box 906. The available report to displays include a group summary window, a group appliance window, a group volume window, a group qtree window, a group quota window and a group event window. Note that the entire network can be one of the "groups" as shown by the menu selection "Global" 908 in the group box 902.

A particular report within the GUI is selected using the respective tab in the menu is 910. In this example, the Summary 912 tab is selected. The depicted summary 900 window includes a status box 920, a usage chart 925, an events box 927, and boxes that contain information relating to file servers 929 and disks 931. The status box 920 displays information such as the current status of the group, volume capacity, qtree capacity and number of qtrees in the group. The usage chart 925 displays a time graphed usage chart of the capacity of the qtrees comprising the group. In alternate embodiments, the time scale can be user modified. The events box 927 displays the number of events of various types for this group. Event type can include, for example, Emergency, Critical, Error, Warning and Information. In alternate embodiments, the event types can be clicked on to bring up a additional information regarding the various events. The file server 929 box displays information relating to the number of file servers involved in hosting the various volumes and qtrees comprising this group. Additionally, the disks 931 box displays information relating to the number of and type of the disks that are associated with this group.

Figure 10:
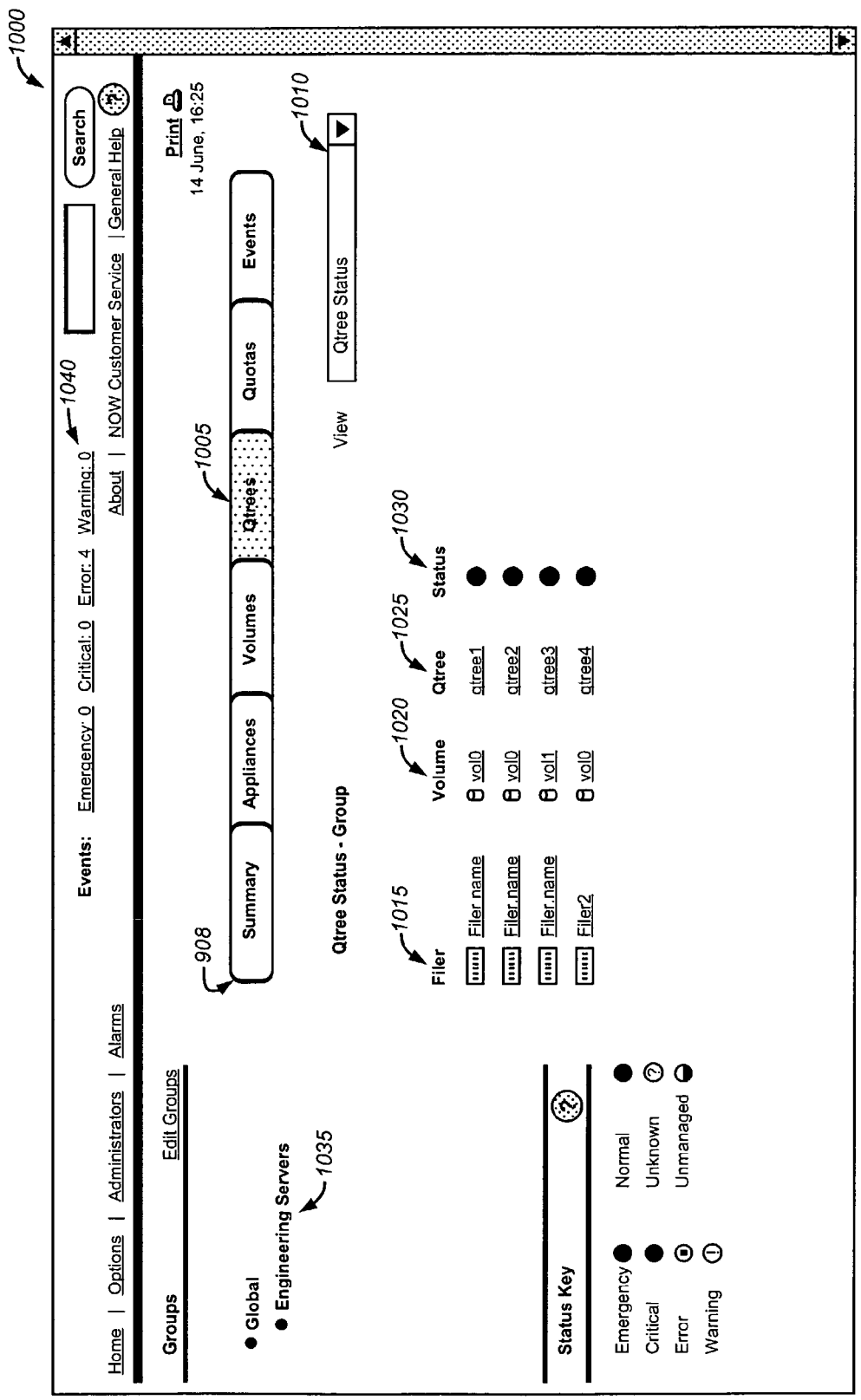
FIG. 10 shows a graphical user interface window showing an exemplary directory information relating to a specified group in accordance with an embodiment of the present invention.

FIG. 10 shows a GUI window 1000 in which the Qtrees tab 1005 has been selected to display qtree (or directory) information relating to the selected group "Engineering Servers" 1035. The window 1000 depicts qtree information such as a filer name 1015, volume 1020, qtree identification 1025, and status 1030. The group status 1030 can be color coded or have icons to depict the status such as, e.g., emergency, critical, error, warning, unknown, or normal. In addition, a events are displayed in an event box 1040 that tracks the number of emergency, critical, error, and warning events that have occurred. A user or system administrator can select from the view menu 1010 various views including, for example, qtree status (shown), qtree capacity, qtree space available, qtree growth, qtree expandability, and qtree thresholds.

Figure 11:
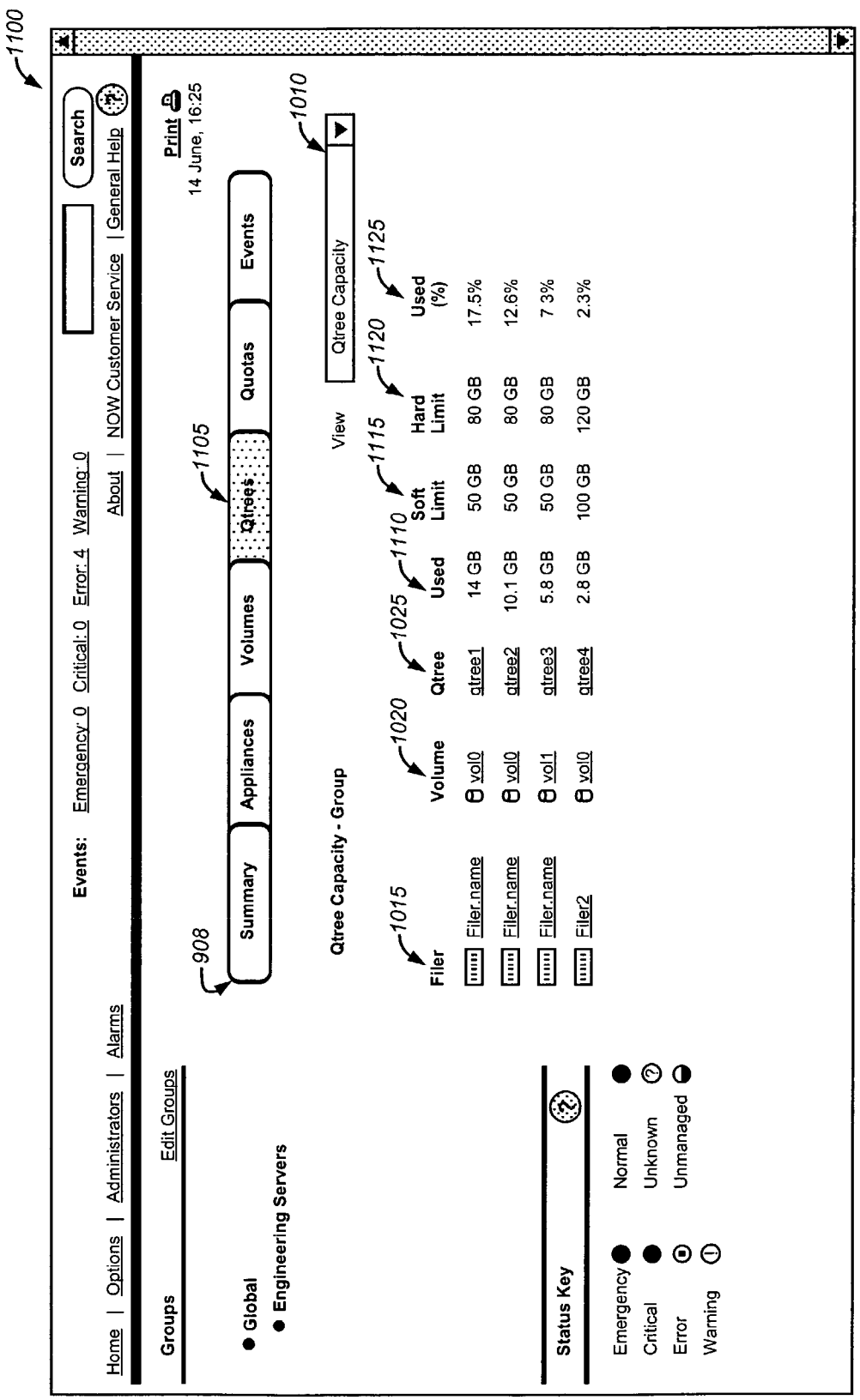
FIG. 11 shows an exemplary graphical user interface window showing a directory or qtree capacity view in accordance with an embodiment of the invention.

FIG. 11 shows a GUI window 1100 showing a qtree capacity view as selected by a user or administrator from menu 1010. This GUI window 1100 includes entries for the qtrees contained in the group and shows the name of the filer 1015, the volume 1020, the qtree 1025, the space used on the qtree 1110, a "soft" limit of the qtree 1115, a "hard" limit of the qtree 1120 and a percent used 1125 of the qtree. By "soft limit" it is meant a threshold above which the filer will generate a warning message. Similarly a "hard limit" is a limit that restricts the amount of space that can be used in the qtree. Thus, if a user attempts to write more than a soft limit, the write will succeed, but an error message will be logged. Conversely, if a user attempts to write more than the hard limit, the write will fail. Thus, in this example qtree 4, which is contained in Vol∅ of Filer 2 has 2.9 gigabytes (GB) used with a soft limit of 100 GB and a hard limit of 120 GB. This equates, in this example, 2.3% of the space of the qtree being utilized.

Figure 12:
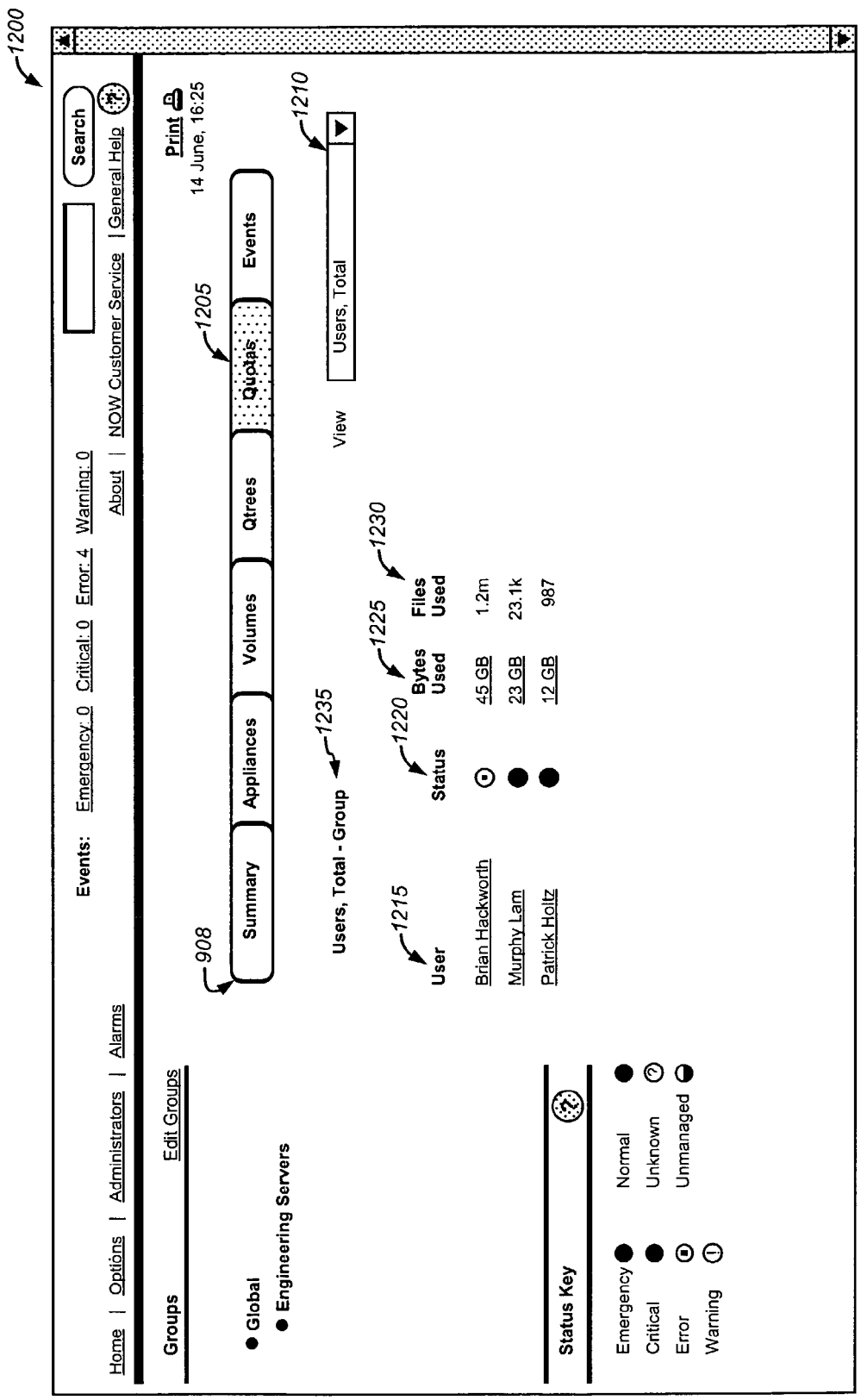
FIG. 12 shows an exemplary graphical user interface window showing quota usage for users of a group in accordance with an embodiment of the present invention.

FIG. 12 is an exemplary GUI window 1200 showing total quota usage for users of a group. As can be seen from window 1200, the quotas tab 1205 of the set of tabs 908 has been selected. The view of FIG. 12 shows that the total for the group has been sorted by users as identified by Title 1235. The window 1200 includes entries listing users 1215, the status, bytes used, 1225, and number of files used 1230 for each particular user within the group. Thus, in this example, user Brian Hackworth has an error status relating to the directories in his group and has used 45 gigabytes and 1.2 million files.

Figure 13:
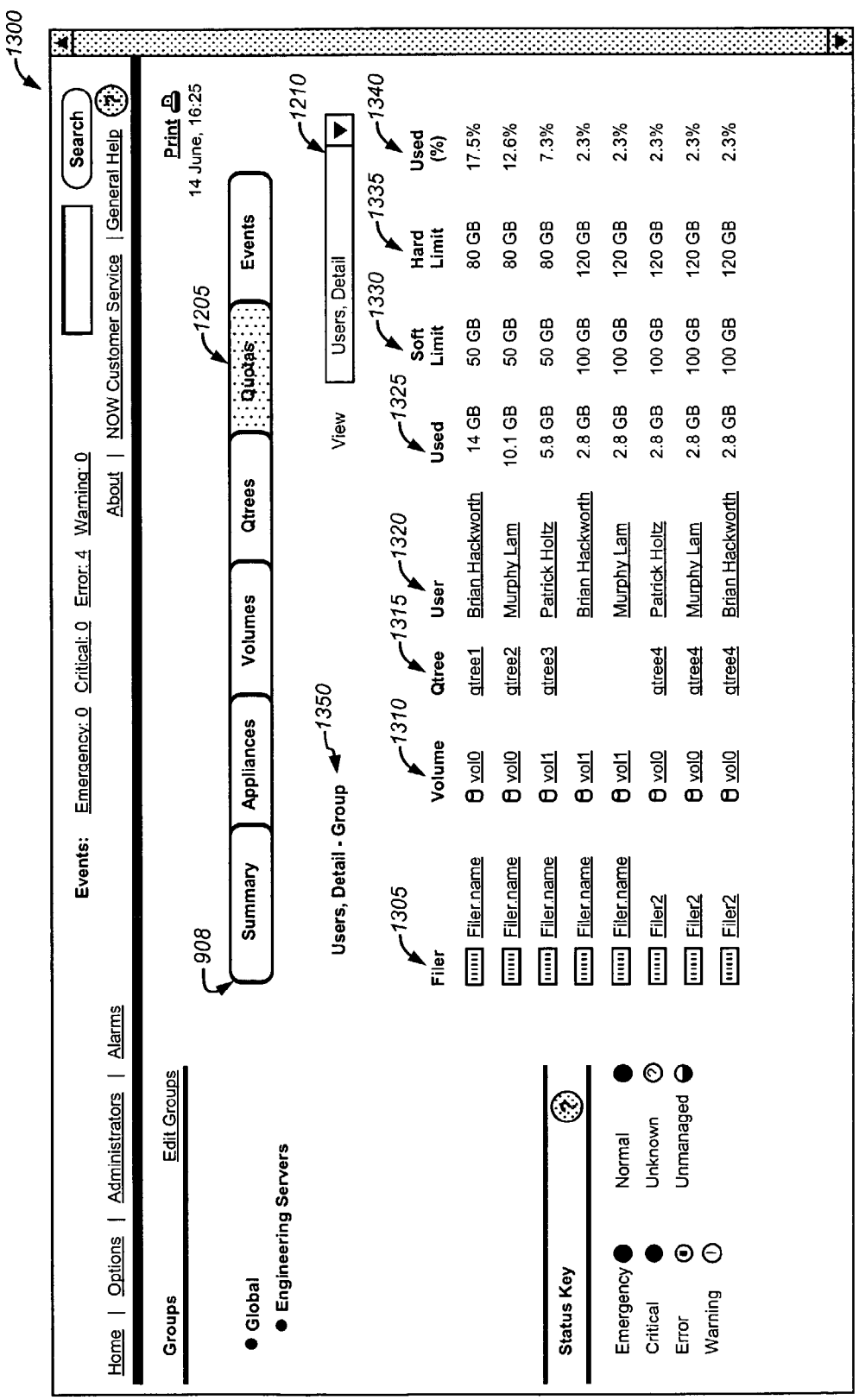
FIG. 13 shows a graphical user interface window displaying detailed information for each of a set of users of a group in accordance with an embodiment of the invention.

FIG. 13 shows a window 1300 showing detailed information for each of the users within a group 1350. The user, detailed option has been selected for menu 1210. The window 1300 includes entries for the name of a filer 1305, a volume 1310, a specific qtree 1315, the owning user 1320, the amount used within the particular qtree 1325, a soft and hard limit 1330 and 1335, respectively, and a percent used of the qtree.

Figure 14:
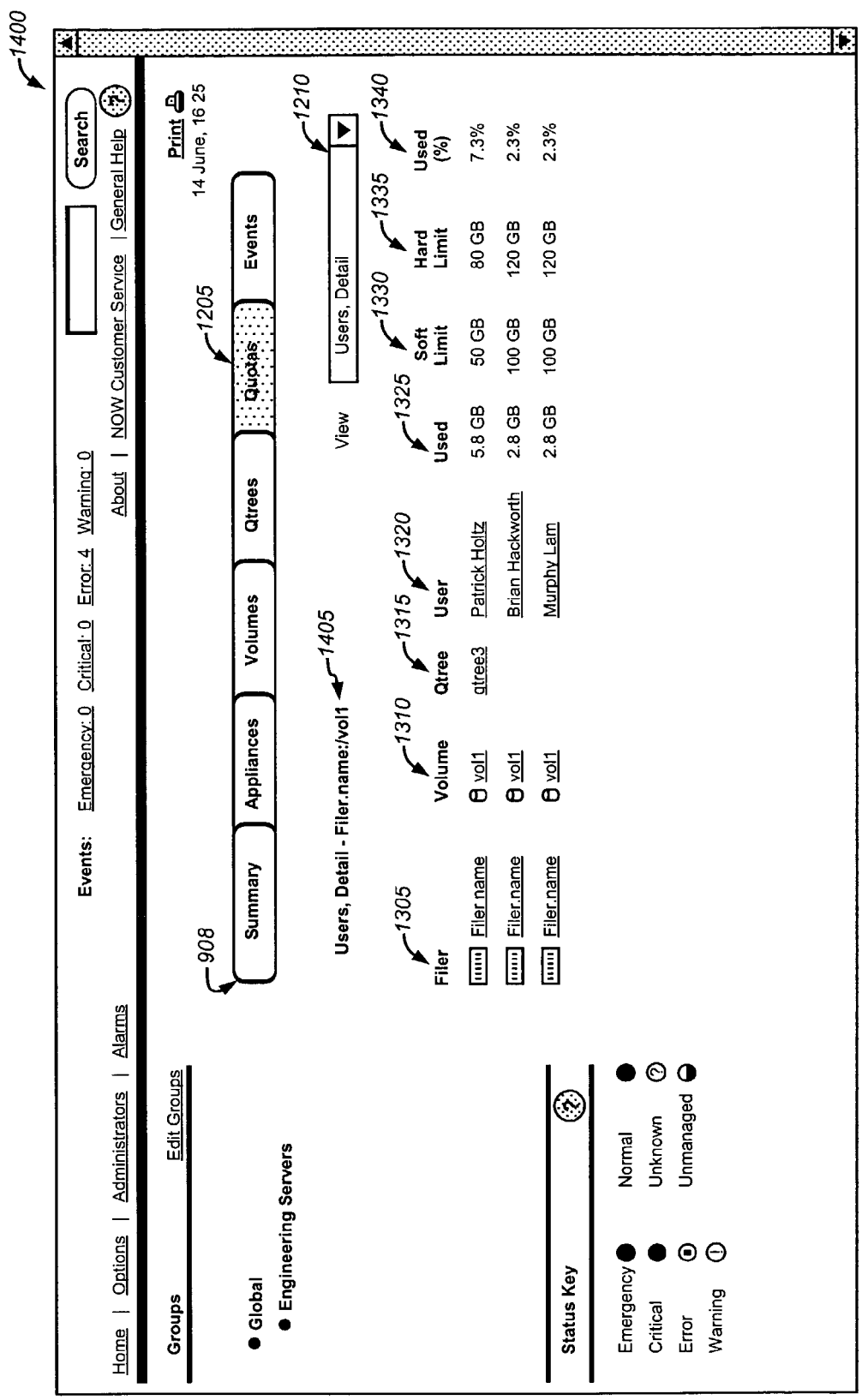
FIG. 14 shows a graphical user interface window showing user quota with specific details for a single volume in accordance with an embodiment of the invention.

FIG. 14 shows a window 1400 showing the user quotas with specific details for a single volume. In this example, the window 1400 includes the same entries as in FIG. 13, namely filer name 1305, volume 1310, qtree 1315, user 1320, space used 1325, soft and hard limits 1330 and 1335 respectively, and percent used 1340. As can be seen from the identification bar 1405, this window is showing the detailed information for users for Vol1 on a particular filer.

Figure 15:
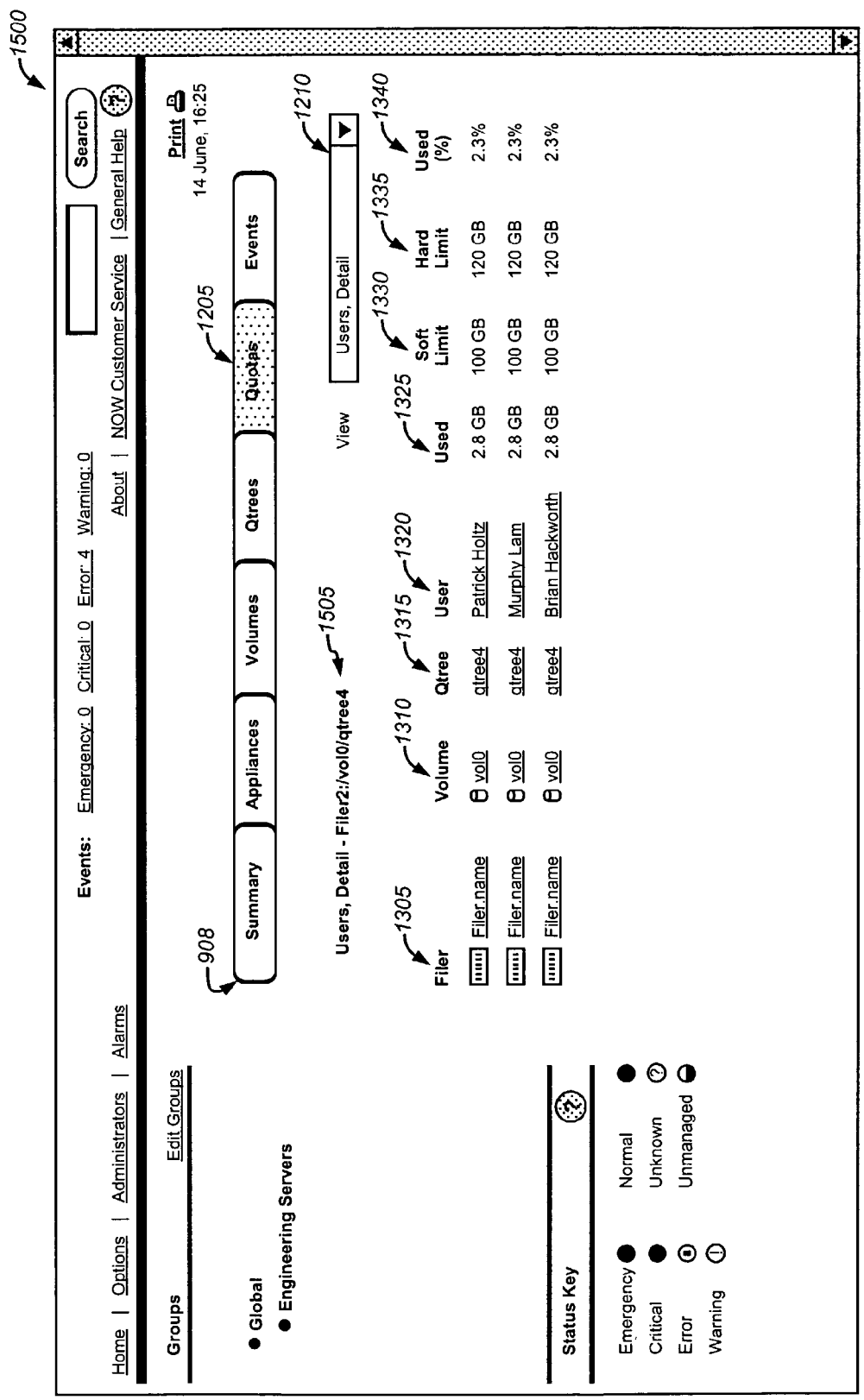
FIG. 15 shows a graphical user interface window detailing quota information for users of a particular directory in accordance with an embodiment of the invention.

FIG. 15 shows detailed quota information for users of a particular qtree (or directory). In this example, the window 1500 is showing detailed information for Qtree 4 of Vol∅ 1505.

Figure 16:
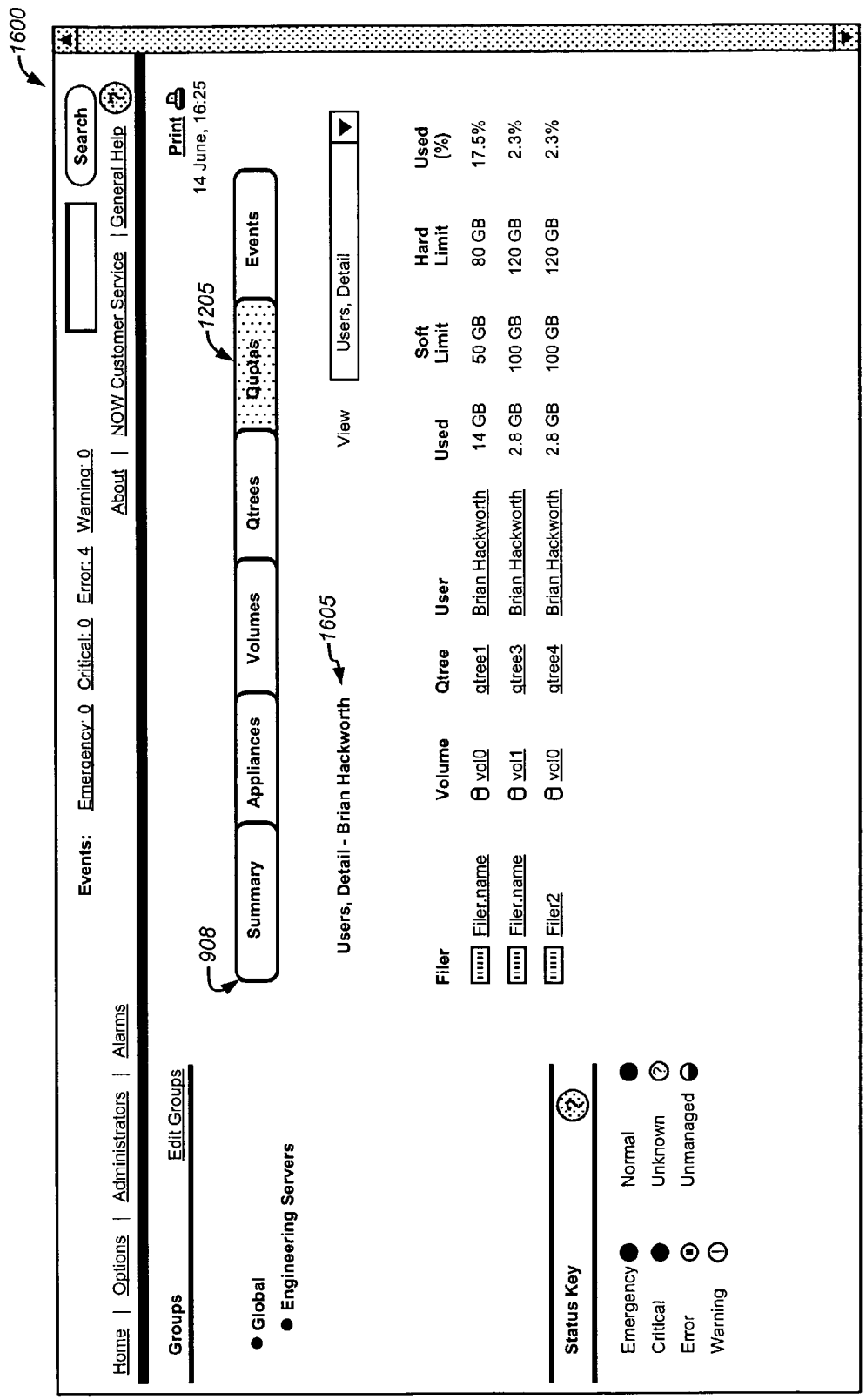
FIG. 16 shows a graphical user interface window detailing quota information for a particular user in accordance with an embodiment of the present invention.

FIG. 16 shows detailed quota information for a particular user, in this example Brian Hackworth 1605. The graphical window 1600 shows the qtrees that the user identified in location 1605 is the registered user of.

Figure 17:
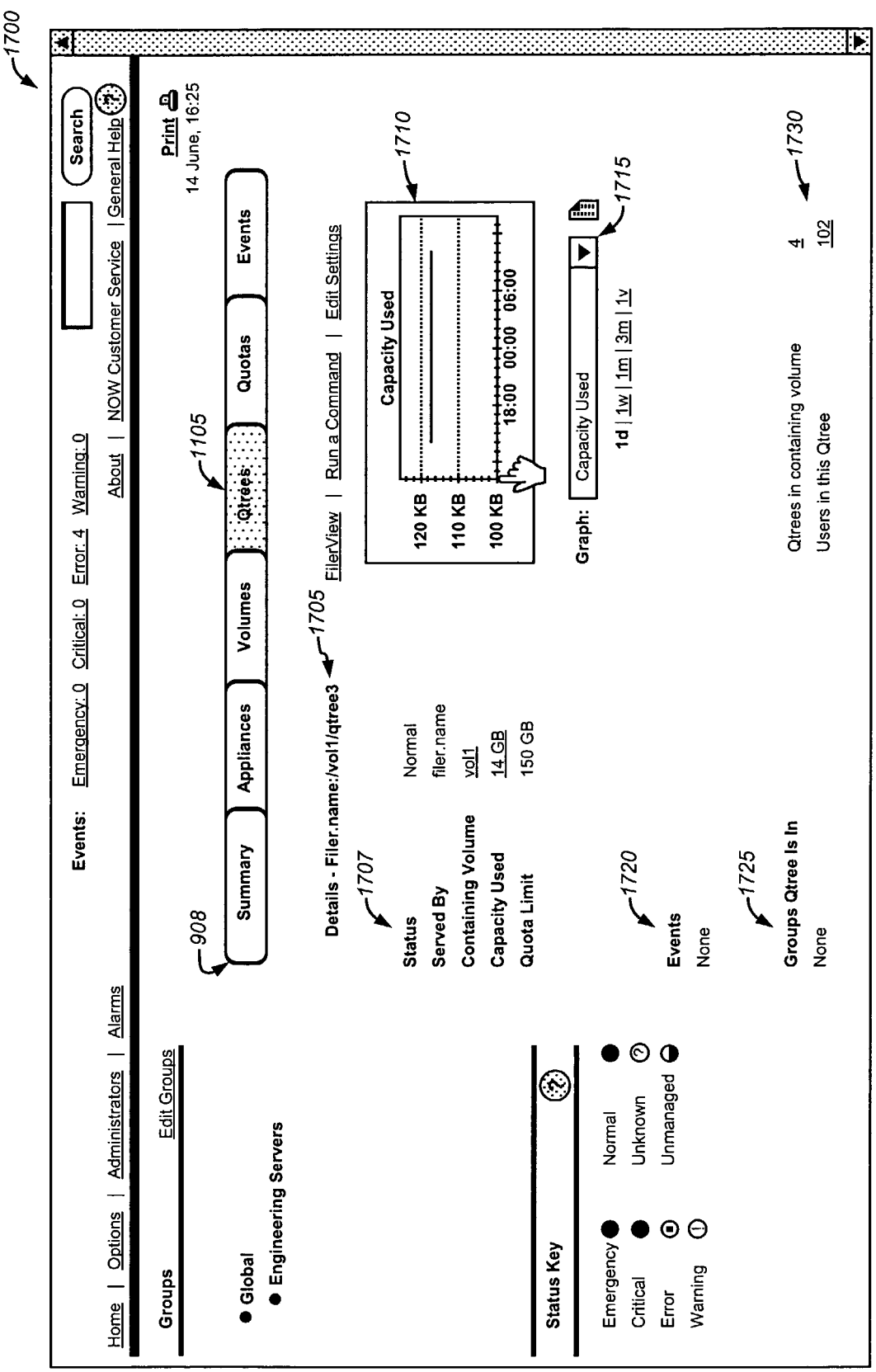
FIG. 17 shows an exemplary graphical user interface window showing individual qtree or directory information in accordance with an embodiment of the present invention.

FIG. 17 is of an exemplary graphical window 1700 showing an individual qtree details. The qtree tab 1105 has been selected within the set of tabs 908. The header information 1705 identifies that qtree 3 of vol1 is having its information displayed. The exemplary window 1700 includes a box 1707 showing basic qtree information including, for example, the status, the name of the appliance currently serving the qtree, the volume that contains the qtree, the quota of the qtree and the capacity used. Additionally, the window 1700 includes a graph 1710 in a menu 1715 which can select from a variety of graphs including, the capacity used of the qtree (as shown in the exemplary figure), the capacity used versus the quota, a percentage of the quota or all of the graphs. The window 1700 also includes a box 1720 listing possible qtree events including, e.g., that the qtrees full, the qtrees nearly full, or that the qtrees growing too fast. The nearly full qtree event will be triggered when the capacity used has passed is certain predefined percentage (see FIG. 18) of the quota limit of the qtree. Box 1730 includes information as to number of qtrees in the volume containing this qtree and the number of users in this qtree. In the exemplary embodiment, by clicking on the users in this qtree number, a user would be linked to a user quota report for this particular qtree (see FIG. 15). Additionally, box 1725 identifies the groups that this particular qtree is a member of.

Figure 18:
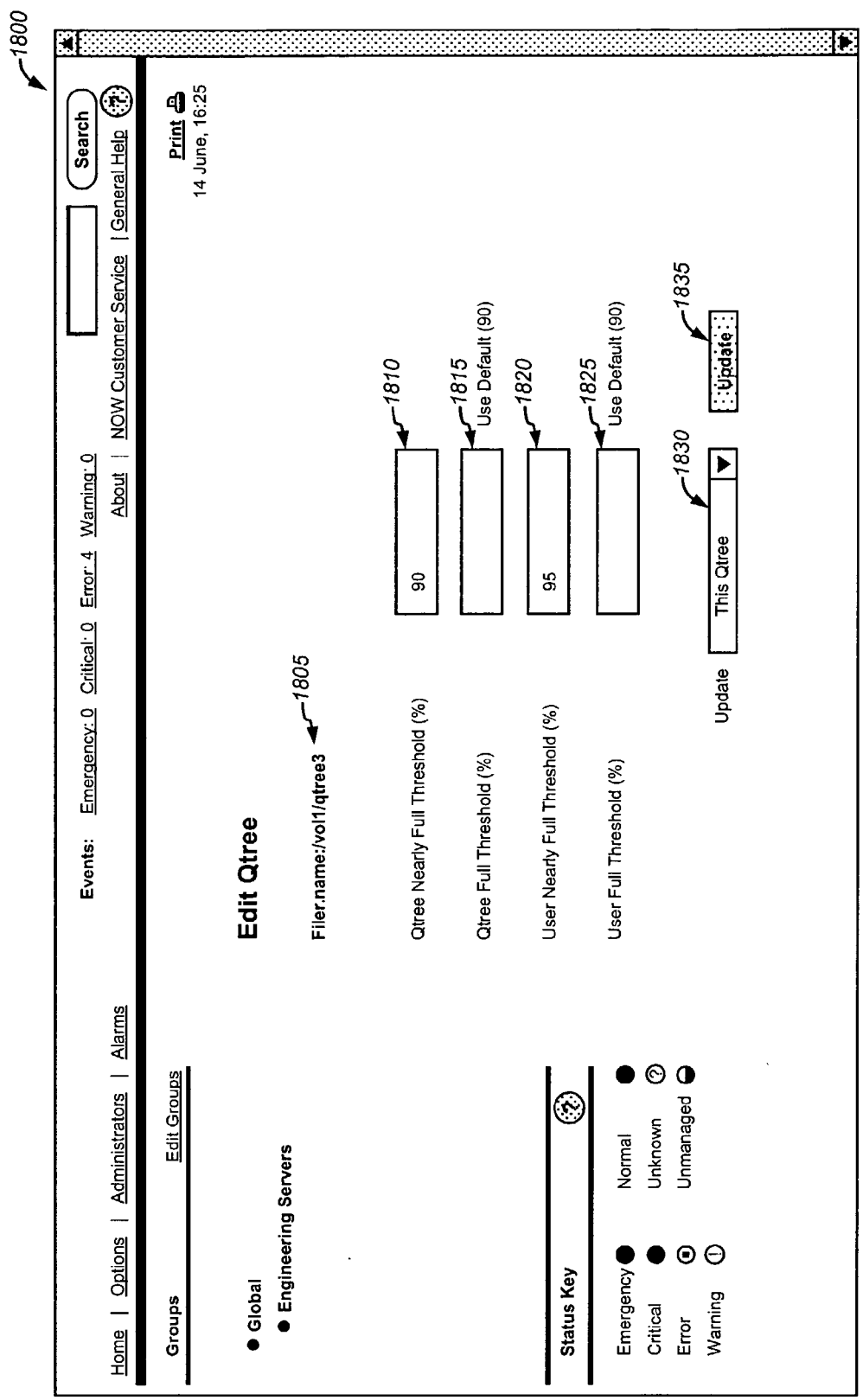
FIG. 18 shows an exemplary graphical user interface window showing options to edit qtree or directory information in accordance with an embodiment of the present invention.

FIG. 18 is an exemplary window 1800 showing a option to edit qtree or directory information. Header information 1805 identifies that Qtree 3 of Vol1 is being operated upon. The window 1800 includes an entry 1810 for setting a nearly full threshold percentage, an entry 1815 for setting a full threshold percentage, and associated entries for setting a user nearly full threshold and user full threshold percentages 1820 and 1825 respectively. Additionally, a menu 1830 permits a user to update just the selected qtree or, for example, all qtrees within a particular group that this qtree is a member of. Additionally, the window 1800 includes an update button 1835 that performs the requested update of the qtree information.

Figure 19:
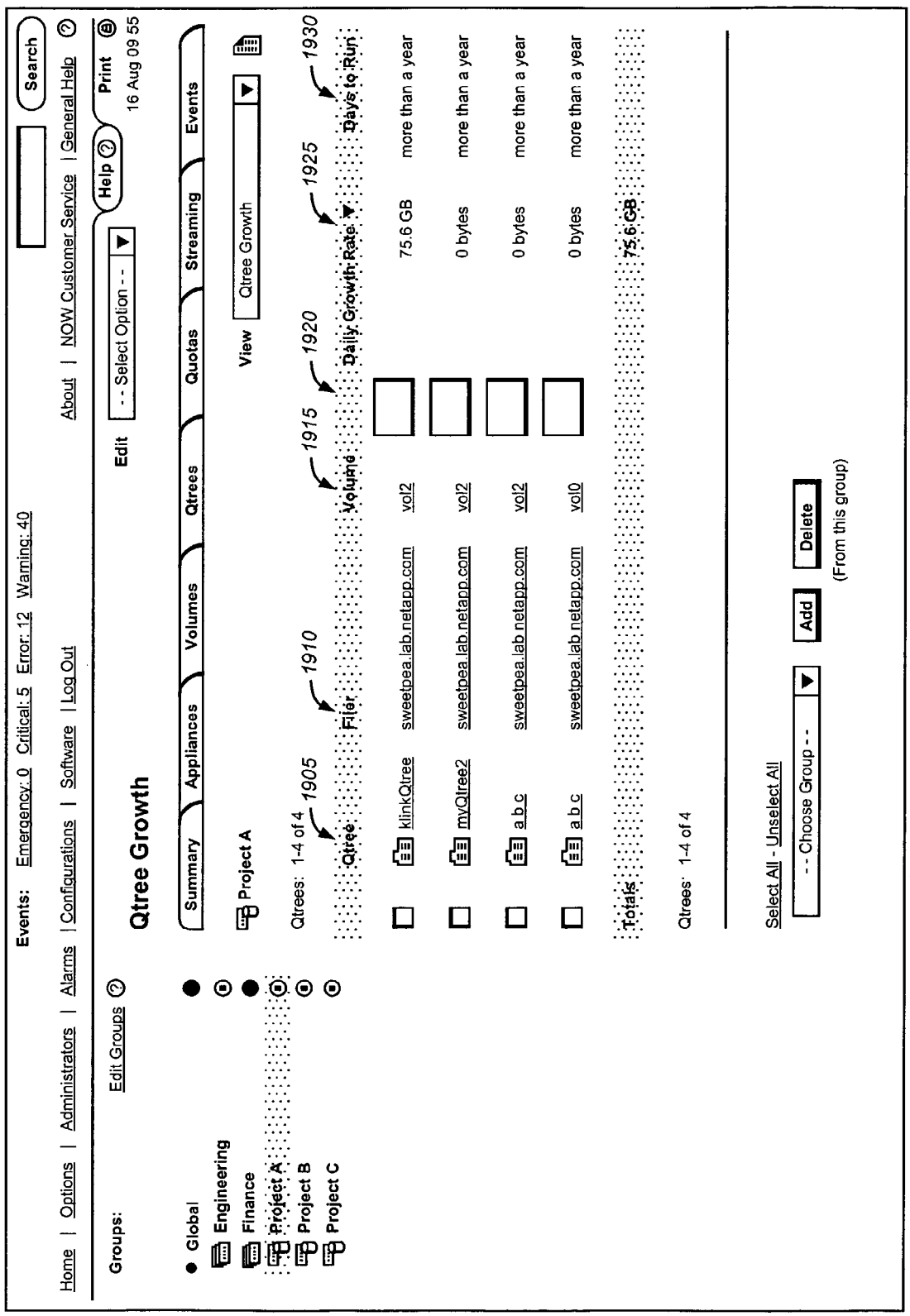
FIG. 19 shows an exemplary graphical user interface window showing qtree growth in accordance with an embodiment of the present invention.

FIG. 19 is an exemplary graphical user interface window 1900 showing qtree growth. The window 1900 includes entries for qtrees 1905, file server 1910, volumes 1915, a chart of usage 1920, a daily growth rate 1925 and an estimate of the number of days to filling the qtree 1930. The qtree entry 1905 identifies a particular qtree associated with the group, while the file server entry 1910 identifies the file server that the qtree is currently being served by. The volume entry 1915 identifies the volume that a particular qtree is a member of. The usage chart 1920 shows a time based graph of the growth of the usage of the particular qtree, while the daily growth rate 1925 shows a numerical amount of growth per day of the given qtree. The days to full entry 1930 shows an estimated number of days of growing at the daily growth rate until a given qtree is full.

To again summarize, the present invention includes a system and method for consolidated reporting of characteristics for a group of directories or qtrees. In accordance with the present invention, one or more directories can be consolidated or combined into arbitrary groups so that statistical information related performance, operation status, or other usage-based parameters may be monitored on a group-by-group basis. According to the illustrative embodiment, a management station that is attached to the network containing the directories includes a graphical user interface that allows the groups to be organized and displayed. After the groups have been generated, a monitor process pulls the directories for statistical information and returns the information to the management station. At the management station, a database stores the information about users in the group in various threshold values associated with the statistical information. This monitor process also compares the thresholds to the monitored statistical information and determines whether a reportable event has occurred. If the monitor process determines that an event has occurred, then the monitor process notifies an event process that determines if there are any interested parties associated with this event. If there are any interested parties to a particular event, then the event process notifies the interested parties according a preset and predetermined methodology, e.g., an email message to the interested party.

In this manner, the system and method allow users to manage the reporting for a group of directories or qtrees under a user-defined group. Thus, a system administrator can consolidate several directories or qtrees into a group to enable more efficient and easier management of a particular groups resources.

The foregoing has been a detailed description of preferred embodiments of the invention. Various modifications and additions can be made without departing from the spirit and scope of this invention. For example, the management station network location and functional architecture can vary. Additional network devices and storage appliances can be provided. Similarly, it is expressly contemplated that the network may include only a single storage appliance and that volume information is consolidated into groups from volumes on that particular appliance. Other storage architectures, such as storage area networks can also be employed. Also, the GUI can include other utilities and windows beyond those shown and described herein. Furthermore, it is expressly contemplated that the processes and architecture shown described according to this invention can be implemented as software, consisting of a computer readable medium including program instructions executing on a computer; as hardware or firmware implemented using state machines and the like; or as a combination of hardware, software and firmware. Accordingly this description is meant to be taken only by way of example, and not to otherwise limit the scope of this invention

What is claimed is:

1. A computer system for reporting information related to a plurality of directories in at least one storage appliance, comprising:

a subset of directories of the plurality of directories associated with a directory group according to predetermined criteria, wherein the directory group comprises a logical consolidation of the subset of directories in response to the predetermined criteria, wherein each directory is a file configured to store one or more other files and one or more other directories;

an interface operatively connected to the computer system configured to associate a predefined group of parties with the directory group;

a processor, executing a monitor process, configured to retrieve statistical information exclusively related to the subset of directories in the directory group at a group timing interval associated with the directory group, the processor further configured to compare the statistical information of the directory group to a group event parameter associated with the directory group to determine that a directory logically consolidated in the directory group has exceeded a statistical information threshold value;

the processor, in response to the exceeded threshold value, further configured to execute an event process to query a database to determine if a party of the predefined group of parties associated with the directory group is implicated by the exceeded threshold value of the directory logically consolidated in the directory group; and the processor, in response to determining that the party of the predefined group of parties is implicated by the exceeded threshold value of the directory logically consolidated in the directory group, further configured to execute a reporting process that generates a window that organizes and displays to the implicated party of the predefined group of parties the directory logically consolidated in the directory group of which the statistical information exceeded the threshold value.

2. The system as set forth in claim 1, wherein the event parameters are configured to control the monitoring of the statistical information.

3. The system as set forth in claim 2, wherein the event parameters include at least one of a central processing utilization level, a storage device free space, a storage device used space, an environmental condition and operational status.

4. The system as set forth in claim 1, wherein the reporting process is configured to e-mail event information to the implicated party of the predefined group of parties.

5. The system as set forth in claim 4, wherein the e-mail comprises a web link for use by the implicated party of the predefined group of parties.

6. The system as set forth in claim 1, wherein the database is configured to retain information with respect to the implicated party of the predefined group of parties and the threshold value.

7. The system as set forth in claim 1, wherein each of the directories of the plurality of directories is configured to be attached to each of a plurality of storage appliances, respectively.

8. The system as set forth in claim 1, further comprising:
a command process configured to generate one or more web pages that report the statistical information to the implicated party of the predefined group of parties.

9. The system as set forth in claim 8, wherein the web pages are configured to be constructed and configured to be arranged as graphical user interfaces that enable display of the statistical information in a plurality of predetermined windows and boxes within the windows based upon selection criteria entered for the implicated party of the predefined group of parties.

10. The system as set forth in claim 9, further comprising:
alerts displayed on the graphical user interface based upon problems identified by the monitor process with respect to volumes or devices associated with the volumes.

11. The system as set forth in claim 10, wherein the alerts are color-coded based upon severity of the problems, respectively.

12. The system as set forth in claim 1, wherein the reporting process is configured to consolidate the statistical information from one or more of the volumes on one or more storage appliances.

13. The system as set forth in claim 1, wherein at least one directory is a qtree.

14. The system of claim 1, wherein the statistical information comprises a hard limit and a soft limit associated with the directories;
wherein the soft limit is a user-definable quota associated with a given directory; and
wherein the hard limit is associated with a maximum storage capacity of a set of storage devices comprising the directories.

15. The system as set forth in claim 1, wherein the monitor process is further configured to poll for event data and statistical information in connection with each identified directory.

16. The system as set forth in claim 1, wherein a graphical user interface (GUI) is used to display the group statistical information.

17. A system, comprising:
a computer configured to organize information stored on one or more storage devices as a plurality of directories, wherein each directory is a file configured to store one or more other files and one or more other directories;
a first plurality of directories of the plurality of directories associated with a first directory group according to a first predetermined criteria, and a second plurality of directories of the plurality of directories associated with a second directory group according to a second predetermined criteria;
a processor of the computer configured to enable a logical consolidation of the first plurality of directories into the first directory group in response to the first predetermined criteria, the processor further configured to enable a logical consolidation of the second plurality of directories into the second directory group in response to the second predetermined criteria;
an interface operatively connected to the computer configured to associate a first predefined group of parties with the first directory group, the interface further configured to associate a second predefined group of parties with the second directory group; and
a command process interacting with the processor configured to generate a window that displays statistical information exclusively related to the first plurality of directories in the first directory group to the first predefined group of parties, the command process further configured to generate a window that displays statistical information exclusively related to the second plurality of directories in the second directory group to the second predefined group of parties.

18. The system of claim 17, wherein the statistical information comprises at least one of central processing unit usage, directory storage device free space, directory storage device used space, environmental conditions, general operational status, and events in which an operational parameter exceeds a predetermined threshold.

19. The system of claim 18, wherein the events comprise alerts that are color-coded based upon severity of the event.

20. The system of claim 18, further comprising a link box that directs a party of the predefined group of parties to network or Internet-based utilities in connection with the information.

21. The system of claim 17, wherein the display window is configured to be formatted as a web page and is displayed on a web browser.

22. A method for reporting information related to predetermined storage directories of one or more storage volumes in a network, comprising:
associating a plurality of directories of a plurality of directories with a directory group according to predetermined criteria, wherein each directory is a file configured to store one or more other files and one or more other directories;
consolidating, logically, the plurality of directories into the directory group in response to the predetermined criteria;
associating a predefined group of parties with the directory group;
selecting a set of event parameters for controlling monitoring of statistical information of each directory of the directory group;
selecting a set of time intervals for monitoring each directory of the directory group;
selecting group statistical information for the directory group;
retrieving the group statistical information for the directory group using the set of time intervals and the group event parameters and comparing the group statistical information to determine that statistical information of a directory of the directory group exceeds a threshold value; and
generating a window that displays and organizes the statistical information exclusively related to the directory group with the directory of which the statistical information exceeds the threshold value to the predefined group of parties.

23. The method as set forth in claim 22, further comprising sending an e-mail of the statistical information to the predefined group of parties.

24. The method as set forth in claim 23, further comprising:
formatting a web page comprising the statistical information in a predetermined display format.

25. The method as set forth in claim 24, further comprising:
changing the predetermined display format based upon user-selected criteria.

26. The method as set forth in claim 22, wherein the display window is generated at a management station.

27. The method as set forth in claim 26, further comprising indicating a severity of a problem associated with a respective event by providing a color coded alert.

28. A computer-readable medium containing executable program instructions executed by a processor, comprising:
program instructions that associate a plurality of directories of a plurality of directories with a directory group according to predetermined criteria, wherein each directory is a file configured to store one or more other files and one or more other directories;
program instructions that consolidate, logically, the plurality of directories into the directory group in response to the predetermined criteria;
program instructions that associate a predefined group of parties with the directory group;
program instructions that select a set of event parameters for controlling monitoring of statistical information of each directory of the directory group;
program instructions that select a set of time intervals for monitoring each directory of the directory group;
program instructions that select group statistical information for the directory group;
program instructions that retrieve the group statistical information for the directory group using the set of time intervals and the group event parameters and compare the group statistical information to determine that statistical information of a directory of the directory group exceeds a threshold value; and
program instructions that generate a window that displays and organizes the statistical information exclusively related to the directory group with the directory of which the statistical information exceeds the threshold value to the predefined group of parties.

29. A method for organizing and displaying information with respect to one or more directories on one or more storage appliances attached to a network, each of the directories having statistical information associated therewith, comprising:
forming one or more qtree groups from a plurality of qtrees stored on one or more volumes of the storage appliance, wherein each qtree is a file configured to store one or more other files and one or more other qtrees;
associating a predefined group of parties with each qtree group;
selecting, for each qtree group, a set of event parameters for controlling monitoring of statistical information of each directory of the qtree group, hereinafter group event parameters;
selecting, for each qtree group, a set of time intervals for monitoring each qtree of the qtree group, hereinafter group time interval;
selecting, for each qtree group, statistical information for that qtree group, hereinafter group statistical information;
retrieving group statistical information for each qtree group using the group timing interval and the group event parameters and comparing the group statistical information to determine if statistical information of a qtree of one of the qtree groups exceeds a threshold value; and
generating a window that displays and organizes the statistical information of the qtree group with the qtree of which the statistical information exceeds the threshold value to the predefined group of parties.

30. The method as set forth in claim 29, further comprising:
comparing known predetermined threshold values to the group event parameters and generating an event condition when the group statistical information of the group event parameters exceeds the threshold value.

31. The method as set forth in claim 29, further comprising:
notifying the predefined group of parties if the threshold value has been exceeded using an electronic message.

32. A management station for reporting information related to directories, comprising:
a plurality of directories formed into one or more directory groups stored on one or more volumes of a storage appliance, wherein each directory is a file configured to store one or more other files and one or more other directories;
an interface connected to a computer and configured to associate a predefined group of parties with the directory group;
group event parameters selected for each directory group;
group time interval selected for each directory group;
group statistical information selected for each directory group;
a processor to execute a monitor process to retrieve, for each directory group, the directory group statistical information at the group timing interval, and the group event parameters, to compare the directory group statistical information to determine that a directory formed into a directory group has statistical information which exceeded a threshold value; and
the processor to execute a reporting process that generates a window to display the directory group statistical information of the directory which exceeded threshold value of the statistical information to the predefined group of parties.

33. The management station of claim 32, wherein data of one or more directories is organized as a RAID system.

34. The management station of claim 32, wherein the directory group statistical information further comprises:
a hard limit associated with the directories, wherein the hard limit is associated with a maximum storage capacity of a set of storage devices comprising the directories; and
a soft limit associated with the directories, wherein the soft limit is a user- definable quota associated with a given directory.

35. The management station of claim 32, wherein the reporting process further comprises:
an event process for notifying the predefined group of parties that an event condition has occurred with respect to the directories based upon the directory group statistical information.

36. The management station of claim 35, wherein the event condition occurs in response to the group statistical information of the group parameters exceeding the threshold value.

37. The management station of claim 36, wherein the group event parameters comprise at least one of a central processing utilization level, a storage disk free space, a storage disk used space, an environmental condition, and an operational status.

38. A method for reporting information related to directories, comprising;

forming one or more qtree groups from a plurality of qtrees stored on one or more volumes of a storage appliance, wherein each qtree is a file configured to store one or more other files and one or more other qtrees;

associating a predefined group of parties with each qtree group;

selecting, for each qtree group, a set of event parameters for controlling monitoring of statistical information of each qtree of the qtree group, hereinafter group event parameters;

selecting, for each qtree group, a set of time intervals for monitoring each qtree of the qtree group, hereinafter group time interval;

selecting, for each qtree group, statistical information for that qtree group, hereinafter group statistical information;

retrieving group statistical information for each qtree group using the group timing interval and the group event parameters and comparing the group statistical information to determine if statistical information of a qtree of one of the qtree groups exceeds a threshold value; and reporting the group statistical information for the qtree which has statistical information that exceeds the threshold value to the predefined group of parties.

39. The method of claim 38, further comprising organizing data of at least one qtree as a RAID system.

40. The method of claim 38, wherein the group statistical information further comprises:
associating a hard limit with the qtrees, wherein the hard limit is associated with a maximum storage capacity of a set of storage devices comprising the qtrees; and
associating a soft limit with the qtrees, wherein the soft limit is a user-definable quota associated with a given qtree.

41. The method of claim 38, wherein the reporting further comprises:
notifying the predefined group of parties that an event condition has occurred based upon the group statistical information.

42. The method of claim 38, further comprising:
determining that an event condition has occurred in response to the group statistical information of the group event parameters exceeding the threshold value.

43. The method of claim 38, wherein the group event parameters comprise at least one of a central processing utilization level, a storage disk free space, a storage disk used space, an environmental condition, and an operational status.

44. The method of claim 38, wherein an administrator selects the qtrees to be associated with the qtree group.

45. The method of claim 38, further comprising:
reporting the statistical information to the predefined group of parties.

46. The method of claim 38, further comprising:
generating a window that displays and organizes the statistical information of the qtree group with the qtree of which the statistical information that exceeds the threshold value to the predefined group of parties.

47. The method of claim 46, further comprising:
querying a database to determine if a party of the predefined group of parties associated with the qtree group is implicated by the exceeded threshold value.

48. An apparatus for reporting information related to directories, comprising;
means for forming one or more qtree groups from a plurality of qtrees stored on one or more volumes of a storage appliance, wherein each qtree is a file configured to store one or more other files and one or more other qtrees;
means for associating a predefined group of parties with each qtree group;
means for selecting, for each qtree group, a set of event parameters for controlling monitoring of statistical information of each qtree of the qtree group, hereinafter group event parameters;
means for selecting, for each qtree group, a set of time intervals for monitoring each qtree of the qtree group, hereinafter group time interval;
means for selecting, for each qtree group, statistical information for that qtree group, hereinafter group statistical information;
means for retrieving group statistical information for each qtree group using the group timing interval and the group event parameters and comparing the group statistical information to determine if statistical information of a qtree of one of the qtree groups exceeds a threshold value; and
means for reporting the group statistical information for the qtree which has statistical information that exceeds the threshold value to the predefined group of parties.

49. The apparatus of claim 48, wherein data of at least one qtree is organized as a RAID system.

50. The apparatus of claim 48, wherein the statistical information further comprises:
means for associating a hard limit with the qtrees, wherein the hard limit is associated with a maximum storage capacity of a set of storage devices comprising the qtrees; and
means for associating a soft limit with the qtrees, wherein the soft limit is a user-definable quota associated with a given qtree.

51. The apparatus of claim 48, wherein the reporting process further comprises:
means for notifying the predefined group of parties that an event condition has occurred based upon the statistical information of the qtree.

52. The apparatus of claim 48, further comprising:
means for determining that an event condition has occurred in response to the group statistical information of the group event parameters exceeding the threshold value.

53. The apparatus of claim 48, wherein the group event parameters comprise at least one of a central processing utilization level, a storage disk free space, a storage disk used space, an environmental condition, and an operational status.

54. A computer-readable medium containing executable program instructions executed by a processor, comprising:
program instructions that form one or more qtree groups from a plurality of qtrees stored on one or more volumes of a storage appliance, wherein each qtree is a file configured to store one or more other files and one or more other qtrees;
program instructions that associate a predefined group of parties with each qtree group;
program instructions that select, for each qtree group, a set of event parameters for controlling monitoring of statistical information of each qtree of the qtree group, hereinafter group event parameters;
program instructions that select, for each qtree group, a set of time intervals for monitoring each qtree of the qtree group, hereinafter group time interval;
program instructions that select, for each qtree group, statistical information for that qtree group, hereinafter group statistical information;

program instructions that retrieve group statistical information for each qtree group using the group timing interval and the group event parameters and comparing the group statistical information to determine if statistical information of a qtree of one of the qtree groups exceeds a threshold value; and program instructions that report the group statistical information for the qtree which has statistical information that exceeds the threshold value to the predefined group of parties.

55. A computer data storage system, comprising:
at least one volume defining a logical arrangement of storage space on a cluster of physical storage media;
at least one directory, wherein each directory comprises portions of one of the volumes allocated for storing data, and wherein each directory is a file configured to store one or more other files and one or more other directories;
a processor executing a directory grouping process forming one or more directory groups from a plurality of directories;
an interface operatively connected to the computer data storage system and configured to associate a predefined group of parties with the directory group;
the process configured to select for each group of the one or more groups a set of event parameters for controlling monitoring of statistical information, hereinafter group event parameters;
the process further configured to select for each group of the one or more groups a set of time intervals for monitoring, hereinafter group time interval;
the process further configured to select for each directory group of the one or more groups statistical information for that group for monitoring, hereinafter group statistical information;
the processor executing a process to retrieve for each group, the group statistical information at the group time interval, the group event parameters, and the process to compare the group statistical information to determine that a directory of one of the directory groups exceeds a threshold value of the group statistical information; and
the processor executing a reporting process organizing and displaying the group statistical information having the directory whose statistical information exceeds the threshold value to the predefined group of parties.

56. The system of claim 55, wherein the directory grouping process comprises an administrator interface.

57. The system of claim 55, wherein the statistical information is a member from a set consisting of:
an amount of storage space consumed by each directory;
an amount of storage space allocated to each directory;
a number of files consumed in each directory; and
a number of files allocated to each directory.

58. A method for reporting information related to a computer data storage system, comprising:
assigning directories to at least one directory group, each directory consisting of portions of a volume, each volume defining a logical arrangement of storage space on a cluster of physical storage media, and wherein each directory is a file configured to store one or more other files and one or more other directories;
associating a predefined group of parties with the directory group;
selecting for each directory group a set of event parameters for controlling monitoring of statistical information, hereinafter group event parameters;
selecting for each directory group a set of time intervals for monitoring, hereinafter group time interval;
selecting for each directory group statistical information for that directory group for monitoring, hereinafter group statistical information;
retrieving group statistical information at the group timing interval and the group event parameters for each group and comparing the group statistical information to determine that a directory of the directory group has exceeded the threshold value of the statistical information; and
reporting the group statistical information of the directory of which has exceeded the threshold value to the predefined group of parties.

59. The method of claim 58, comprising:
reporting the statistical information to the predefined group of parties in accordance with an association of the predefined group of parties with the directory group.

60. The method of claim 59, wherein the reporting is performed in response to event conditions defined by the predefined group of parties, the event conditions comprising the directory group meeting statistical thresholds.

* * * * *

UNITED STATES PATENT AND TRADEMARK OFFICE
CERTIFICATE OF CORRECTION

PATENT NO. : 7,739,614 B1
APPLICATION NO. : 10/234621
DATED : June 15, 2010
INVENTOR(S) : Brian M. Hackworth Page 1 of 2

It is certified that error appears in the above-identified patent and that said Letters Patent is hereby corrected as shown below:

In the Specification

In col. 1, line 57 should read:
cally organized as one or more ~~is~~ groups of Redundant Army In col. 5, line 40 should read:
related to management station operations ~~to~~ and functions.

In col. 5, line 46 should read:
exemplary network ~~stores age~~ storage appliance 110 (Filer 1) that is In col. 6, line 5 should read:
the filer 110 by, inter ~~alfa~~ _alia_, invoking storage operations in In col. 6, line 16 should read:
can comprise a ~~to~~ point-to-point connection or a shared In col. 6, line 61 should read:
In ~~to~~ the illustrative embodiment described herein, the storage In col. 7, line 26 should read:
data blocks and using ~~modes~~ inodes to describe the files. The file In col. 7, line 31 should read:
file system layer 330 indexes into the ~~Mode~~ inode file using the In col. 7, line 32 should read:
~~Mode~~ inode number to access an appropriate entry and retrieve a Signed and Sealed this
Second Day of July, 2013

Teresa Stanek Rea
_Acting Director of the United States Patent and Trademark Office_

CERTIFICATE OF CORRECTION (continued)
U.S. Pat. No. 7,739,614 B1

In col. 9, line 40 should read:
administrators and particular users (for example, ~~is~~ an iden- In col. 10, line 62 should read:
network switching appliance connected to the ~~is~~ network (e.g.

In col. 11, line 29 should read:
report ~~to~~ displays include a group summary window, a group In col. 11, line 36 should read:
respective tab in the menu ~~is~~ 910. In this example, the Sum-